(12) United States Patent
Smith et al.

(10) Patent No.: US 10,091,184 B2
(45) Date of Patent: Oct. 2, 2018

(54) CONTINUOUS MULTI-FACTOR AUTHENTICATION

(71) Applicant: Intel Corporation, Santa Clara, CA (US)

(72) Inventors: Ned M. Smith, Hillsboro, OR (US); Conor Cahill, Waterford, VA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/644,891

(22) Filed: Jul. 10, 2017

(65) Prior Publication Data
US 2017/0374055 A1   Dec. 28, 2017

Related U.S. Application Data

(63) Continuation of application No. 14/129,443, filed as application No. PCT/US2013/048220 on Jun. 27, 2013, now Pat. No. 9,705,869.

(51) Int. Cl.
*H04L 29/06* (2006.01)
*G06F 21/31* (2013.01)
(Continued)

(52) U.S. Cl.
CPC .......... *H04L 63/0807* (2013.01); *G06F 21/31* (2013.01); *G06F 21/316* (2013.01); *G06F 21/335* (2013.01); *G06F 21/40* (2013.01); *H04L 63/0823* (2013.01); *H04L 63/12* (2013.01); *G06F 2221/2101* (2013.01); *G06F 2221/2141* (2013.01)

(58) Field of Classification Search
None
See application file for complete search history.

(56) References Cited

U.S. PATENT DOCUMENTS

| 4,649,233 A | 3/1987 | Bass et al. |
|---|---|---|
| 5,371,871 A | 12/1994 | Spilo |

(Continued)

FOREIGN PATENT DOCUMENTS

| CN | 102404117 | 4/2012 |
|---|---|---|
| EP | 2194476 A1 | 6/2010 |

(Continued)

OTHER PUBLICATIONS

State Intellectual Property Office of the People's Republic of China, First Office Action dated May 31, 2017, in Chinese Patent Application No. 201380076955.9.

(Continued)

*Primary Examiner* — Michael R Vaughan
(74) *Attorney, Agent, or Firm* — Trop, Pruner & Hu, P.C.

(57) ABSTRACT

Technologies for continuously authenticating a user via multiple authentication factors include a computing device for generating a continuous authentication assertion indicating that continuous authentication of a user is being monitored, sending the continuous authentication assertion to a key distribution center server, and requesting and receiving an initial ticket from the key distribution center server. Such technologies may also include requesting a service ticket from the key distribution center server for accessing a service provider server, receiving a service ticket from the key distribution center server including the continuous authentication assertion, requesting access to the service provider server with the service ticket including the continuous authentication assertion, and accessing the service provider server in response to the continuous authentication assertion being verified.

20 Claims, 8 Drawing Sheets

(51) Int. Cl.
G06F 21/40 (2013.01)
G06F 21/33 (2013.01)

(56) References Cited

U.S. PATENT DOCUMENTS

| | | |
|---|---|---|
| 5,426,775 A | 6/1995 | Boccon-Gibod |
| 5,809,230 A | 9/1998 | Pereira |
| 5,919,257 A | 7/1999 | Trostle |
| 5,943,423 A | 8/1999 | Muftis |
| 6,009,540 A | 12/1999 | Craft et al. |
| 6,195,749 B1 | 2/2001 | Gulick |
| 6,715,073 B1 | 3/2004 | An et al. |
| 7,096,333 B2 | 8/2006 | McBrearty et al. |
| 7,103,529 B2 | 9/2006 | Zimmer |
| 7,127,579 B2 | 10/2006 | Zimmer et al. |
| 7,210,034 B2 | 4/2007 | Smith |
| 7,216,369 B2 | 5/2007 | Wiseman et al. |
| 7,299,354 B2 | 11/2007 | Khanna et al. |
| 7,552,419 B2 | 6/2009 | Zimmer et al. |
| 7,590,867 B2 | 9/2009 | Scarlata et al. |
| 7,606,915 B1 | 10/2009 | Calinov et al. |
| 7,636,442 B2 | 12/2009 | Scarlata et al. |
| 7,657,746 B2 | 2/2010 | Paramasivam et al. |
| 7,827,371 B2 | 11/2010 | Yao et al. |
| 7,841,940 B2 | 11/2010 | Bronstein |
| 8,060,876 B2 | 11/2011 | Smith et al. |
| 8,108,668 B2 | 1/2012 | Rozas |
| 8,327,415 B2 | 12/2012 | Yao et al. |
| 8,639,926 B2 | 1/2014 | Brown |
| 8,719,921 B2 | 5/2014 | Johansson |
| 8,925,053 B1 | 12/2014 | Mehta |
| 9,137,247 B2 | 9/2015 | Smith |
| 9,160,730 B2 | 10/2015 | Sheller |
| 9,231,765 B2 | 1/2016 | Flautner |
| 2001/0037379 A1 | 11/2001 | Livnat |
| 2002/0184491 A1 | 12/2002 | Morgan et al. |
| 2002/0194496 A1 | 12/2002 | Griffin et al. |
| 2003/0023812 A1 | 1/2003 | Nalawadi et al. |
| 2003/0074568 A1* | 4/2003 | Kinsella .................. G06F 21/32 713/186 |
| 2003/0188193 A1 | 10/2003 | Venkataramappa |
| 2004/0039937 A1 | 2/2004 | Aissi et al. |
| 2004/0167894 A1 | 8/2004 | Ziv |
| 2004/0199769 A1 | 10/2004 | Prouder |
| 2004/0268140 A1 | 12/2004 | Zimmer et al. |
| 2005/0021968 A1 | 1/2005 | Zimmer et al. |
| 2005/0057339 A1 | 3/2005 | Ikehara |
| 2005/0060568 A1 | 3/2005 | Beresnevichiene et al. |
| 2005/0063544 A1 | 3/2005 | Uusitalo et al. |
| 2005/0144609 A1 | 6/2005 | Rothman et al. |
| 2005/0204038 A1 | 9/2005 | Medvinsky |
| 2005/0210467 A1 | 9/2005 | Zimmer et al. |
| 2005/0228993 A1 | 10/2005 | Silvester et al. |
| 2005/0246552 A1 | 11/2005 | Bade et al. |
| 2006/0015358 A1 | 1/2006 | Chua |
| 2006/0015717 A1 | 1/2006 | Liu et al. |
| 2006/0020781 A1 | 1/2006 | Scarlata et al. |
| 2006/0021018 A1 | 1/2006 | Hinton et al. |
| 2006/0190985 A1 | 8/2006 | Vasishth et al. |
| 2006/0224878 A1 | 10/2006 | Datta et al. |
| 2006/0230439 A1 | 10/2006 | Smith et al. |
| 2006/0242280 A1 | 10/2006 | Zimmer et al. |
| 2006/0259782 A1 | 11/2006 | Wang et al. |
| 2006/0265340 A1 | 11/2006 | Ziv |
| 2006/0288202 A1 | 12/2006 | Doran et al. |
| 2007/0016766 A1 | 1/2007 | Richmond et al. |
| 2007/0016801 A1 | 1/2007 | Bade et al. |
| 2007/0055856 A1 | 3/2007 | Zimmer et al. |
| 2007/0061561 A1 | 3/2007 | Hashiguchi |
| 2007/0106986 A1 | 5/2007 | Worley |
| 2007/0107048 A1 | 5/2007 | Halls et al. |
| 2007/0112772 A1 | 5/2007 | Morgan et al. |
| 2007/0179905 A1 | 8/2007 | Buch et al. |
| 2007/0198844 A1 | 8/2007 | Morawetz et al. |
| 2007/0226786 A1 | 9/2007 | Berger et al. |
| 2007/0239604 A1 | 10/2007 | O'Connell et al. |
| 2007/0255948 A1 | 11/2007 | Ali et al. |
| 2007/0282757 A1 | 12/2007 | Pandya |
| 2007/0300069 A1 | 12/2007 | Rozas |
| 2008/0022108 A1 | 1/2008 | Brannock et al. |
| 2008/0052777 A1 | 2/2008 | Kawano et al. |
| 2008/0077789 A1* | 3/2008 | Gondo .................. H04L 63/08 713/155 |
| 2008/0083019 A1 | 4/2008 | Wang et al. |
| 2008/0120499 A1 | 5/2008 | Zimmer et al. |
| 2008/0126779 A1 | 5/2008 | Smith |
| 2008/0155277 A1 | 6/2008 | Bulusu et al. |
| 2008/0158000 A1 | 7/2008 | Mattrazzo |
| 2008/0162809 A1 | 7/2008 | Rothman et al. |
| 2008/0175393 A1 | 7/2008 | Oba et al. |
| 2008/0178176 A1 | 7/2008 | Berger et al. |
| 2008/0244292 A1 | 10/2008 | Kumar et al. |
| 2008/0244569 A1 | 10/2008 | Challener et al. |
| 2008/0263636 A1 | 10/2008 | Gusler et al. |
| 2008/0271015 A1 | 10/2008 | Ibrahim |
| 2008/0288782 A1 | 11/2008 | Iyer |
| 2009/0006859 A1 | 1/2009 | Zimmer et al. |
| 2009/0063799 A1 | 3/2009 | Berenbaum et al. |
| 2009/0067685 A1 | 3/2009 | Boshra et al. |
| 2009/0067688 A1 | 3/2009 | Boshra et al. |
| 2009/0070467 A1 | 3/2009 | Khosravi et al. |
| 2009/0110200 A1 | 4/2009 | Srintvas |
| 2009/0132837 A1 | 5/2009 | Kumar |
| 2009/0153292 A1 | 6/2009 | Farb |
| 2009/0172381 A1 | 7/2009 | Zimmer et al. |
| 2009/0172438 A1 | 7/2009 | Kumar et al. |
| 2009/0259848 A1 | 10/2009 | Williams et al. |
| 2009/0292924 A1 | 11/2009 | Johnson et al. |
| 2009/0319806 A1 | 12/2009 | Smith et al. |
| 2009/0327678 A1 | 12/2009 | Dutton et al. |
| 2010/0023782 A1 | 1/2010 | Prakash et al. |
| 2010/0066821 A1 | 3/2010 | Rosener et al. |
| 2010/0082987 A1 | 4/2010 | Thom et al. |
| 2010/0107238 A1 | 4/2010 | Stedman et al. |
| 2010/0169640 A1 | 7/2010 | Smith et al. |
| 2011/0080529 A1 | 4/2011 | Wong |
| 2011/0145598 A1 | 6/2011 | Smith et al. |
| 2011/0154023 A1 | 6/2011 | Smith et al. |
| 2011/0180686 A1 | 7/2011 | Iwai |
| 2011/0191834 A1 | 8/2011 | Singh et al. |
| 2011/0289564 A1 | 11/2011 | Archer et al. |
| 2011/0298183 A1 | 12/2011 | Banerjee et al. |
| 2011/0302653 A1 | 12/2011 | Frantz |
| 2012/0017271 A1 | 1/2012 | Smith et al. |
| 2012/0030730 A1 | 2/2012 | Smith et al. |
| 2012/0089833 A1 | 4/2012 | Jirka et al. |
| 2013/0051632 A1 | 2/2013 | Tsai et al. |
| 2013/0114865 A1* | 5/2013 | Azar .................. G06F 21/32 382/118 |
| 2013/0133055 A1 | 5/2013 | Ali |
| 2013/0198832 A1 | 8/2013 | Draluk |
| 2013/0248717 A1 | 9/2013 | Moore et al. |
| 2014/0189807 A1 | 7/2014 | Cahill |
| 2014/0250523 A1 | 9/2014 | Savvides |
| 2014/0282868 A1 | 9/2014 | Sheller |
| 2014/0283016 A1 | 9/2014 | Sambamurthy |
| 2014/0366111 A1 | 12/2014 | Sheller |
| 2015/0373007 A1 | 12/2015 | Sheller |

FOREIGN PATENT DOCUMENTS

| | | |
|---|---|---|
| KR | 100705380 B1 | 4/2007 |
| WO | 0186393 A2 | 11/2001 |
| WO | 2012009231 A2 | 1/2012 |
| WO | 2013048434 A1 | 4/2013 |

OTHER PUBLICATIONS wikipedia.org, "Kerberos (protocol)," retrieved from: <http://en.wikipedia.org/w/index.php?title=Kerberos_(protocol)&oldid.-546334739>, edited Mar. 22, 2013, 5 pages.

(56) References Cited

OTHER PUBLICATIONS wikipedia.org, "Security Assertion Markup Language," retrieved from: <http://en.wikipedia.org/w/index.php?oldid=543247415>, edited Mar. 10, 2013, 9 pages.
kimtag.com, "NFC Tags Explained," retrieved from: <http://kimtag.com/s/nfc_tags>, Jan. 25, 2013, pp. 1-4.
wikipedia.org, "Hardware security module," Wikipedia, The Free Encyclopedia, retrieved from: <http://en.wikipedia.org/wiki/Hardware_security_module>, Jan. 25, 2013, 6 pages.
Smith, "Identity Protection Technology," PC client Group, Massachusetts Institute of Technology, Kerberos Conference, Oct. 25-26, 2011, 22 pages
Intel Corporation, "Intel Trusted Execution Technology (Intel TXT), Software Development Guide, Measured Launched Environment Developer's Guide," Mar. 2011, 112 pages.
Trusted Computing Group, Inc., "TPM Main Part 1 Design Principles," Specification Version 1.2, Level 2 Revision 116, TCG Published, Mar. 1, 2011, 184 pages.
Trusted Computing Group, Inc., "TPM Main Part 2 TPM Structures," Specification Version 1.2, Level 2 Revision 116, TCG Published, Mar. 1, 2011, 202 pages.
Trusted Computing Group,Inc.,"TPM Main Part 3 Commands," Specification Version 1.2, Level 2 Revision 116, TCG Published, Mar. 1, 2011, 339 pages.
Intel Corporation, "Trusted Execution Technology, Hardware-based Technology for Enhancing Server Platform Security," White Paper, 2010, 8 pages
MIT Kerberos Consortium, "Best Practices for Integrating Kerberos into Your Application," Jul. 23, 2008, 27 pages.
MIT Kerberos Consortium, "The Role of Kerberos in Modern Information Systems," 2008, 53 pages.
Scarfone et al. "Guide to Storage Encryption Technologies for End User Devices," NIST Pub. 800-11, Nov. 2007, 40 pages.
Zhu et al., "RFC 4556: Public Key Cryptography for Initial Authentication in Kerberos (PKINIT)" Jun. 2006, 42 pages.
Cervesato et al., "Breaking and Fixing Public-Key Kerberos," International Workshop on Issues in the Theory of Security, 2006, 15 pages.
Neuman et al., "RFC 1510: The Kerberos Network Authentication Service (V5)," Jul. 2005, 136 pages.
Oasis Open, "Assertions and Protocols for the OASIS Security Assertion Markup Language (SAML) V2.0," OASIS Standard, Mar. 15, 2005, 86 pages.
Oasis Open, "Kerberos SAML Profiles," Working Draft 03, Feb. 10, 2004, 13 pages.
Worldtel Inc. "C.O.B.A.S. Centralized Out-Of-Bank Authentication System," Southeast Europe Cybersecurity Conference, Sep. 8-9, 2003, retrieved from: <http://www.cybersecuritycooperation.org/documents/QT_COBAS_White_Paper.pdf>, 14 pages.
Krawczyk, "SIGMA: the 'SIGn-and-MAc' Approach to Authenticated Diffie-Hellman and its Use in the IKE Protocols," CRYPTO 2003, Proceedngs of 23rd Annual International Cryptoiogy Conferences, Aug. 17-21, 2003 26 pages.
Intel Corporation, "Trusted Execution Technology Architectural Overview," 2003, 8 pages.
Sirbu et al., "Distributed Authentication in Kerberos Using Public Key Cryptography", In: Symposium on Network and Distributed System Security, San Diego, California: IEEE Computer Society Press, 1997, 8 pages.
U.S. Appl. No. 131785,883, filed Mar. 5, 3013, 34 pages.
U.S. Appl. No. 13/629,895, filed Sep. 28, 2012, 22 pages.
U.S. Appl. No. 13/721,760, filed Dec. 20, 2012, 28 pages.
International Search Report and Written Opinion received for International Application No. PCPUS2013/048220, dated Mar. 17, 2014, 13 pages.
Dirk Balfanz, "FIDO U2F Raw Message Formats", FIDO Alliance Proposed Standard, May 14, 2015, pp. 1-10, FIDO Alliance.
Rolf Lindemann, "FIDO Security Reference", FIDOAlliance Proposed Standard, May 14, 2015, pp. 1-30, FIDO Alliance.
Dirk Balfanz, "FIDO U2F Implementation Considerations", FIDO Alliance Proposed Standard, May 14, 2015, pp. 1-5, FIDO Alliance.
Dirk Balfanz, FIDO U2F Javascript APO, FIDO Alliance Proposed Standard, May 14, 2015, pp. 1-7, FIDO Alliance.
Alexei Czeskis, "FIDO NFC Protocol Specification v1.0", FIDO Alliance Proposed Standard, May 14, 2015, pp. 1-5, FIDO Alliance.
Sampath Srinivas, "Universal 2nd Factor (U2F) Overview", FIDO Alliance Proposed Standard, May 14, 2015, pp. 1-5, FIDO Alliance.
Salah Machani, et al., "FIDO UAF Review Draft Spec Set", FIDO Alliance'Proposed Standard, Dec. 8, 2014, pp. 1-202.
European Patent Office, Extended European Search Report dated Jan. 5, 2017 in European Patent Application No. 13887611.5.
European Patent Office, Notice of Allowance dated Oct. 20, 2017, in European Patent Application No. 13 887 611.5-1870.

* cited by examiner

CONTINUOUS MULTI-FACTOR AUTHENTICATION

This application is a continuation of U.S. patent application Ser. No. 14/129,443, filed Dec. 26, 2013, which is a § 371 national stage of international application PCT/US2013/048220, which filed Jun. 27, 2013, the content of which is hereby incorporated by reference.

BACKGROUND

Multi-factor authentication is an approach to computerized security procedures that requires the user to provide more than one form of verification to prove their identity in order to gain access to sensitive data or computer systems. Commonly-used forms of verification include knowledge-based verification data (e.g., something the user knows, such as a password or Personal Identification Number), token-based verification data (e.g., something the user has, such as a private key, security token or smart card), and biometric data (e.g., a physiological or behavioral characteristic of the user). More recently, efforts have been undertaken to continuously authenticate the user to increase the security of sensitive data or computer systems.

Existing network security infrastructures typically utilize one or more network authentication protocols such as, for example, Kerberos to authenticate users and control which network resources users are permitted to access. To do so, many of these network security infrastructures include one or more authentication components, which are often well-established systems within the network infrastructure. Such authentication systems, however, do not support continuous user authentication. Further, modifying existing authentication systems to include additional functionally can be costly and error prone.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
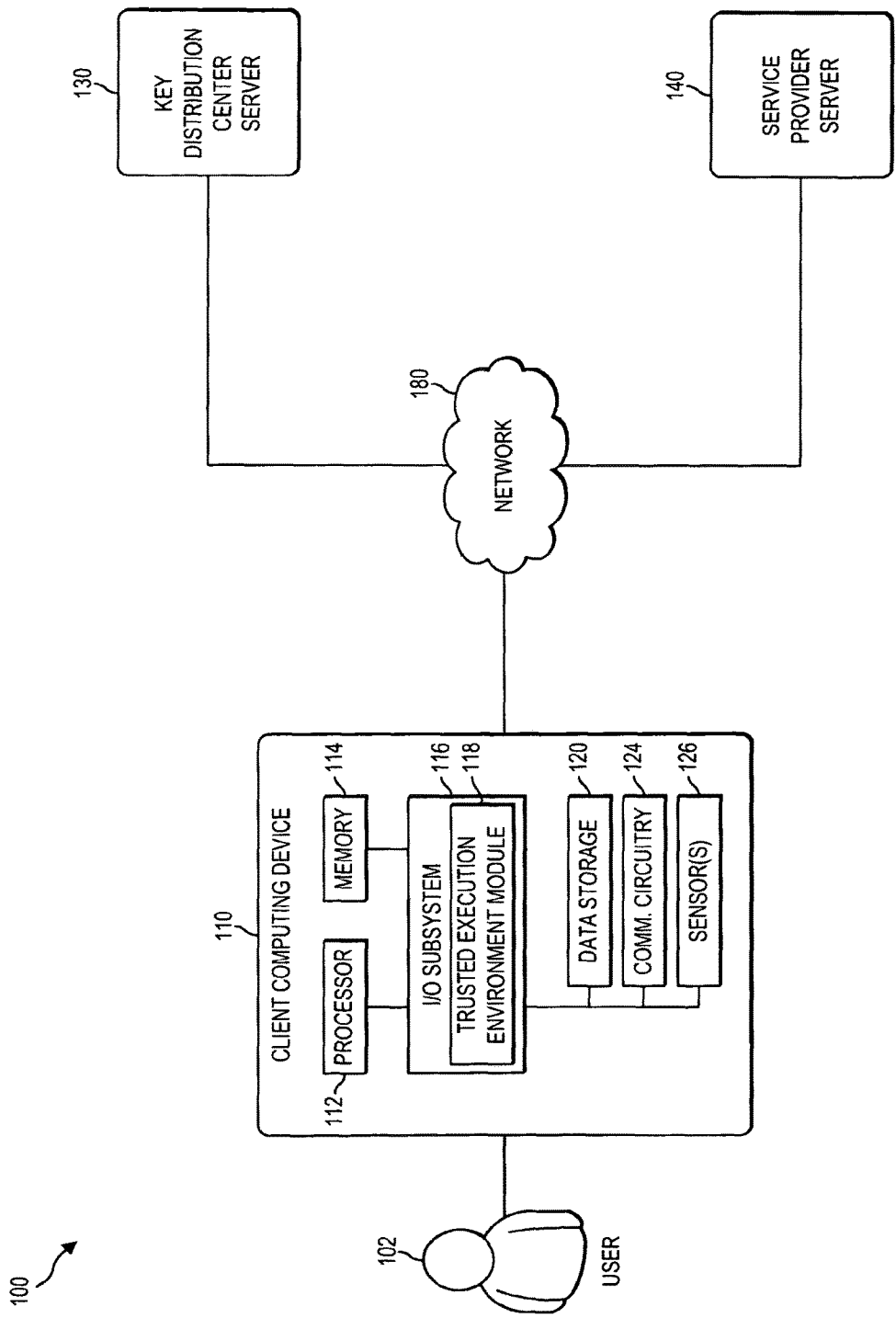
FIG. 1 is a simplified block diagram of at least one embodiment of a system for using a computing device to provide continuous multi-factor authentication.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for continuously authenticating a user 102 via multiple authentication factors includes a client computing device 110, a key distribution center server 130, and a service provider server 140. In use, the client computing device 110 is configured to authenticate the user 102 using multiple authentication factors (e.g., biometric, proximity, user input, user presence, etc.) and monitor the continuous authentication of the user 102 of the client computing device 110. The client computing device 110 is also configured provide an assertion that the authentication of the user 102 is being continuously monitored. In some embodiments, the client computing device 110 provides the assertion of continuous user authentication monitoring to the key distribution center server 130, which may be configured to issue one or more service tickets and/or credentials necessary to access the service provider server 140 or a particular resource provided by the service provider server 140. The service tickets provided by the key distribution center server 130 may include the assertion of continuous user authentication monitoring which, as discussed in more detail below, may be verified by the service provider server 140 prior to granting access to the client computing device 110. In this way, the client computing device 110 rather than the key distribution center server 130 may perform continuous authentication of the user 102 and, as a result, the need for modifying and/or re-deploying the key distribution center server 130 may be reduced.

The client computing device 110 may be embodied as any type of computing device capable of performing the functions described herein including, but not limited to, a desktop computer, a set-top box, a smart display device, a server, a mobile phone, a smart phone, a tablet computing device, a personal digital assistant, a consumer electronic device, a laptop computer, a smart display device, a smart television, and/or any other type of computing device. As shown in FIG. 1, the illustrative client computing device 110 includes a processor 112, a memory 114, an input/output (I/O) subsystem 116, a data storage 120, communication circuitry 124, and one or more sensors 126. Of course, the client computing device 110 may include other or additional components, such as those commonly found in a computer and/or a server (e.g., various input/output devices), in other embodiments. Additionally, in some embodiments, one or more of the illustrative components may be incorporated in, or otherwise from a portion of, another component. For example, the memory 114, or portions thereof, may be incorporated in the processor 112 in some embodiments.

The processor 112 may be embodied as any type of processor capable of performing the functions described herein. For example, the processor 112 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the client computing device 110 such as operating systems, applications, programs, libraries, and drivers. The memory 114 is communicatively coupled to the processor 112 via the I/O subsystem 116, which may be embodied as circuitry and/or components to facilitate input/output operations with the processor 112, the memory 114, and other components of the client computing device 110. For example, the I/O subsystem 116 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 116 may form a portion of a system-on-a-chip (SoC) and be incorporated, along with the processor 112, the memory 114, and other components of the client computing device 110, on a single integrated circuit chip.

In some embodiments, the I/O subsystem 116 may include a trusted execution environment module 118, which may be embodied as an embedded microprocessor, such as a security co-processor, that operates independently of the processor 112 to provide a secure and isolated environment that cannot be accessed by the processor 112 or other components of the client computing device 110. In such embodiments, the trusted execution environment module 118 may manage the storage of one or more encryption keys used by the client computing device 110 to secure data and/or communications between the client computing device 110 and one or more of the key distribution center server 130 and the service provider server 140. In such embodiments, the one or more encryption keys may be stored in a portion of the memory 114 that is accessible to the trusted execution environment module 118 and inaccessible to other components of the client computing device 110. In other embodiments, the trusted execution environment module 118 may include internal or local secured memory, separate from the memory 114, in which the encryption keys may be stored. It should be appreciated that the trusted execution environment module 118 may also securely store other types of data in the portion of memory 114 that is accessible to the trusted execution environment module 118 and inaccessible to other components of the client computing device 110. Additionally, the trusted execution environment module 118 may, in some embodiments, function in an operational power state while the processor 112 and other components of the client computing device 110 are in a low-power state (e.g., sleep, hibernate, etc.) or are powered-down. As discussed in more detail below, in some embodiments, the trusted execution environment module 118 may also generate a public/private key pair on behalf of the client computing device 110 and/or the user 102 to facilitate the receipt of one or more service tickets and/or credentials from the key distribution center server 130. It should be appreciated that in some embodiments, however, other components of the client computing device 110 may instead generate the public/private key pair on behalf of the client computing device 110 and/or the user 102. Further, as discussed in more detail below, the trusted execution environment module 118 may also monitor for the continuous authentication of the user 102 of the client computing device 110 and assert to the key distribution center server 130 that such monitoring is being performed.

Additionally, it should be appreciated that in embodiments wherein the client computing device 110 includes a trusted execution environment module 118, the trusted execution environment module 118, or any of the functionality thereof, may be implemented using Intel® Active Management Technology (AMT), using a portion of Intel® AMT, using an Intel® Management Engine (ME), using Intel® vPro™ Technology, using Intel® Core™ vPro™ Technology, using Intel® Identity Protection Technology (IPT), and/or using Intel® IPT with Public Key Infrastructure (PKI), each of which are available from Intel Corporation of Santa Clara, Calif., and/or within chipsets available from Intel Corporation. It should be appreciated, however, that the trusted execution environment module 118, or any of the functionality thereof, may be implemented using other components and/or technologies of trusted computing devices available from other manufacturers.

The communication circuitry 124 of the client computing device 110 may be embodied as any type of communication circuit, device, or collection thereof, capable of enabling communications between the client computing device 110, the key distribution center server 130, the service provider server 140, and/or other computing devices. The communication circuitry 124 may be configured to use any one or more communication technologies (e.g., wireless or wired communications) and associated protocols (e.g., Ethernet, Wi-Fi®, WiMAX, etc.) to effect such communication. In some embodiments, the client computing device 110 and the key distribution center server 130 and/or the service provider server 140 may communicate with each other over a network 180.

The network 180 may be embodied as any number of various wired and/or wireless communication networks. For example, the network 180 may be embodied as or otherwise include a local area network (LAN), a wide area network (WAN), a cellular network, or a publicly-accessible, global network such as the Internet. Additionally, the network 180 may include any number of additional devices to facilitate communication between the client computing device 110, the key distribution center server 130, the service provider server 140, and/or the other computing devices.

The data storage 120 may be embodied as any type of device or devices configured for short-term or long-term storage of data such as, for example, memory devices and circuits, memory cards, hard disk drives, solid-state drives, or other data storage devices. In some embodiments, the client computing device 110 may store various types of data and/or software that the processor 112 is not expected to process in the near future and/or is desirable to retain for extended periods of time.

The one or more sensors 126 may be embodied as any type of device or devices configured to sense characteristics of the user 102 and/or the proximity of the user 102 relative to the client computing device 110. For example, in some embodiments, the one or more sensors 126 may be embodied as, or otherwise include, one or more biometric sensors configured to sense physical attributes (e.g., facial features, speech patterns, retinal patterns, fingerprints, etc.) and/or behavioral characteristics (e.g., eye movement, visual focus, body movement, key input force, key input speed, etc.) of the user 102. Additionally or alternatively, the one or more sensors 126 may be embodied as, or otherwise include, one or more proximity detection sensors configured to sense the proximity of the user 102 or a physical token (e.g., a radio-frequency identification tag, a near field communication tag, a radio frequency transmitter, etc.) carried by the user 102. The one or more sensors 126 may also be embodied as one or more sensors configured to sense the user's 102 interaction with the client computing device 110. For example, in some embodiments, the one or more sensors 126 may be embodied as one or more accelerometers configured to sense the carrying and/or movement of the client computing device 110 by the user 102. It should be appreciated that although the client computing device 110 includes the one or more sensors 126 in the illustrative embodiment, it should be understood that all or a portion of the one or more of the sensors 126 may be separate from the client computing device 110 in other embodiments. As discussed below, the information sensed by the one or more sensors 126 may be used in part to authenticate the user 102 to the client computing device 110.

The key distribution center server 130 may be embodied as any type of server capable of performing the functions described herein. As such, the key distribution center server 130 may include various hardware and software components (e.g., a processor, memory, and communication circuitry) typically found in a server for communicating, storing, maintaining, and transferring data over the network 180. In operation, the key distribution center server 130 may be configured to generate one or more service tickets and/or credentials for accessing the service provider server 140 and/or a resource of the service provider server 140. To do so, the key distribution center server 130 may be configured to communicate with the trusted execution environment module 118 over the network 180, which is acting on behalf of the user 102. In some embodiments, the key distribution center server 130 may establish a trust with the trusted execution environment module 118 via one or more key exchanges (e.g., SIGn-and-MAc (SIGMA), Diffie-Hellman, PKINIT, etc.). It should be appreciated that, in some embodiments, the key distribution center server 130 may have previously established a trust with the trusted execution environment module 118 via one or more key exchanges (e.g., SIGn-and-MAc (SIGMA), Diffie-Hellman, PKINIT, etc.). In either case, the key distribution center server 130 may receive an assertion from the trusted execution environment module 118 that the continuous authentication of the user 102 is being monitored. As discussed in more detail below, the key distribution center server 130 may also be configured to include the assertion in the one or more service tickets and/or credentials provided to the client computing device 110 for accessing the service provider server 140 and/or a resource of the service provider server 140.

The service provider server 140 may be embodied as any type of server capable of performing the functions described herein. As such, the service provider server 140 may include various hardware and software components (e.g., a processor, memory, and communication circuitry) typically found in a server for communicating, storing, maintaining, and transferring data over the network 180. The service provider server 140 is configured to provide one or more resources (e.g., file access, network services, etc.) to the client computing device 110. In some embodiments, the service provider server 140 is configured to enable the client computing device 110 to access such resources in response to verifying the assertion from the client computing device 110 that the authentication of the user 102 is being continuously monitored. As discussed in more detail below, the assertion from the client computing device 110 may be included within the service ticket originally provided by the key distribution center server 130.

Figure 2:
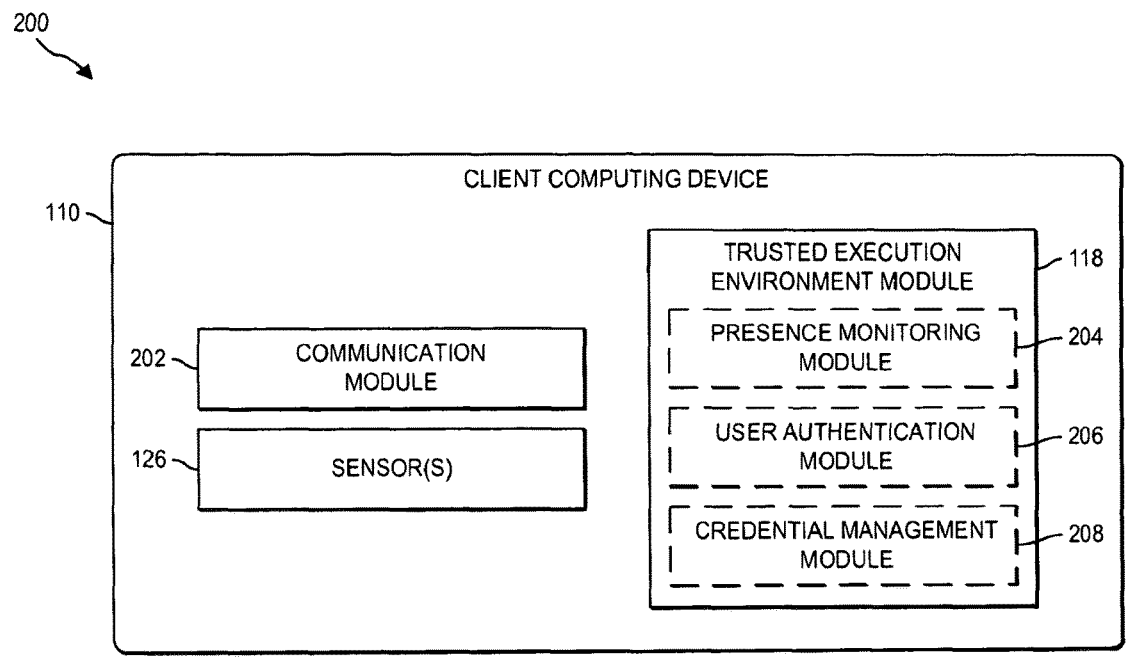
FIG. 2 is a simplified block diagram of at least one embodiment of an environment of the client computing device of the system of FIG. 1.

Referring now to FIG. 2, in use, the client computing device 110 establishes an environment 200 during operation. The illustrative environment 200 includes a communication module 202, the trusted execution environment module 118, and the one or more sensors 126. Each of the modules 202, 118, 126 of the environment 200 may be embodied as hardware, software, firmware, or a combination thereof. It should be appreciated that the client computing device 110 may include other components, sub-components, modules, and devices commonly found in a computing device, which are not illustrated in FIG. 2 for clarity of the description.

The communication module 202 of the client computing device 110 facilitates communications between components or sub-components of the client computing device 110 and the key distribution center server 130 and/or the service provider server 140. For example, the communication module 202 may facilitate sending and receiving communication messages (e.g., public/private key pairs, digital certificates, user presence information, authentication information, credentials, access tickets, access requirements, etc.) to and from the key distribution center server 130 and/or the service provider server 140. Additionally, in some embodiments, the communication module 202 manages communications between components or sub-components of the client computing device 110. For example, the communication module 202 may facilitate communications between the trusted execution environment module 118 and the one or more sensors 126 and/or other components of the client computing device 110.

The trusted execution environment module 118 manages user authentication and the credentials needed for the user 102 to access, via the client computing device 110, the service provider server 140 and/or one or more resources provided by the service provider server 140. As discussed below, the trusted execution environment module 118 also continuously monitors the user's 102 presence relative to the client computing device 110. To do so, in some embodiments, the trusted execution environment module 118 may include a presence monitoring module 204, a user authentication module 206, and a credential management module 208.

The presence monitoring module 204 of the trusted execution environment module 118 may continuously monitor the user's 102 presence with respect to the client computing device. That is, the presence monitoring module 204 may determine whether the user 102 is located in proximity to the client computing device 110. To do so, the presence monitoring module 204 may receive information sensed by one or more of the sensors 126 indicative of the proximity of the user 102 relative to the client computing device 110. For example, the one or more sensors 126 may be configured to sense one or more user inputs (e.g., keyboard input, touchpad input, touch screen input, etc.), wireless communications (e.g., near field communications, radio frequency identification communications, Bluetooth® communications, Wi-Fi® communications, etc.), and/or device component outputs (e.g., accelerometer data, ambient light sensor data, digital camera images, etc.). In response to receiving any such information from the one or more sensors 126, the presence monitoring module 204 may determine whether the user 102 is located within a reference distance from the location of the client computing device 110. Additionally or alternatively, the presence monitoring module 204 may also be configured to determine whether the user 102 is no longer located within the reference distance from the location of the client computing device 110. In some embodiments, the presence monitoring module 204 is configured to generate user presence data indicative of whether the user 102 is located within the reference distance of the location of the client computing device 110.

The user authentication module 206 of the trusted execution environment module 118 may facilitate authenticating the user 102 to the client computing device 110. To do so, the user 102 may be requested to provide verification data to prove their identity to the client computing device 110. The verification data may include knowledge-based verification data (e.g., something the user knows, such as a password or Personal Identification Number), token-based verification data (e.g., something the user has, such as a private key, security token or smart card), and/or biometric verification data (e.g., a physiological or behavioral characteristic of the user). In some embodiments, the user authentication module 206 may require the user 102 to provide a single form of verification data in order to prove their identity. However, in other embodiments, the user authentication module 206 may instead require the user 102 to provide multiple authentication factors (e.g., multiple forms of verification data) to the client computing device 110 in order to prove their identity. The verification data may be provided by the user 102 via one or more user inputs (e.g., via a keyboard, touchpad, touch screen, wireless communication devices, etc.). Additionally or alternatively, the verification data may include data received from the one or more sensors 126 and/or the presence monitoring module 204. For example, in some embodiments, the verification data may include biometric verification data received from the one or more sensors 126. Additionally, the verification data may include the user presence data received from the presence monitoring module 204. Regardless, the user authentication module 206 is configured to authenticate the user 102 based at least in part on, or otherwise as a function of, the one or more forms of verification data.

In some embodiments, the user authentication module 206 may require the user 102 to provide the one or more forms of verification data during initialization (e.g., initial boot) of the client computing device 110. It should be appreciated that the user authentication module 206 may also require the user to provide the one or more forms of verification data at any other time during operation of the client computing device 110. For example, in some embodiments, the user authentication module 206 may require the user 102 to continuously authenticate to the client computing device 110. That is, the user 102 may be required to prove their identity to the client computing device 110 according to a reference time interval (e.g., every five minutes, every ten minutes, every fifteen minutes, etc.). Additionally, in some embodiments, the user 102 may be required be continuously present at the client computing device 110 after initially proving their identity using one or more other forms of verification data.

The credential management module 208 of the trusted execution environment module 118 may facilitate obtaining the credentials necessary for enabling the user 102, via the client computing device 110, to access the service provider server 140 and/or one or more resources provided by the service provider server 140. For example, in some embodiments, a Kerberos network security protocol is used to manage access to the service provider server 140. In such embodiments, the credential management module 208 may be configured to obtain a service ticket required for accessing the service provider server 140 from the key distribution center server 130. To do so, the credential management module 208 may exchange public/private key pairs with the key distribution center server 130, request and receive a ticket granting ticket from the key distribution center server 130, and request and receive a service ticket for accessing the service provider server 140 from the key distribution center server 130.

As discussed, continuous user authentication may be required by the user authentication module 206. For example, in some embodiments, the user 102 may be required be continuously authenticated by the client computing device 110 after initial authentication via one or more forms of verification data. In such embodiments, the credential management module 208 may be configured to generate and provide an assertion to the key distribution center server 130 that the user's 102 authentication is being continuously monitored by the client computing device 110. The assertion may be provided (e.g., transmitted, sent, etc.) to the key distribution center server 130 over the network 180. Additionally or alternatively, in some embodiments, the assertion may include information indicative of the factors (e.g., the forms of verification data) used to authenticate the user 102. For example, in some embodiments, the assertion may include information indicating that the user 102 was authenticated via a username and password received from a keyboard in combination with user presence data sensed by the one or more sensors 126. Additionally, in some embodiments, the assertion may be embodied as a security assertion markup language (SAML) message or a Kerberos safe (KRB_SAFE) message. Regardless, the assertion may be sent to the key distribution center server 130 either before or after requesting a ticket granting ticket from the key distribution center server 130 and/or the initial authentication exchange between the trusted execution environment module 118 and the key distribution center server 130.

In some embodiments, the assertion of continuous user authentication monitoring sent to the key distribution center server 130 may be signed using a user private key of a user public/private key pair generated by the credential management module 208 on behalf of the user 102. In such embodiments, the key distribution center server 130 may be previously provided with the corresponding user public key via one or more public/private key exchanges between the credential management module 208 and the key distribution center server 130. For example, the key distribution center server 130 may have already received the user public key of the user public/private key pair from a previous SIGMA key exchange between the credential management module 208 and the key distribution center server 130.

As discussed, the credential management module 208 may also be configured to request and receive a service ticket required for accessing the service provider server 140 from the key distribution center server 130. To do so, in some embodiments, the credential management module 208 may first request an initial ticket (e.g., a ticket granting ticket) from the key distribution center server 130. The credential management module 208 may receive the ticket granting ticket from the key distribution center server 130 in response. In embodiments wherein continuous user authentication is required, the service ticket received from the key distribution center server 130 may include the signed assertion of continuous user authentication monitoring and the user public key. In response to receiving the service ticket including the signed assertion of continuous user authentication monitoring and the user public key, the credential management module 208 may request access to the service provider server 140 and/or the one or more resources provided by the service provider server 140. In some embodiments, before the user 102 and/or the client computing device 110 is permitted to access the service provider server 140, the assertion of continuous user authentication monitoring is verified by the service provider server 140. In such embodiments, the signed assertion of continuous user authentication monitoring included within the service ticket is verified by the service provider server 140 using the user public key included within the service ticket. In embodiments wherein the signed assertion of continuous user authentication monitor is verified, the client computing device 110 and/or the user 102 of the client computing device 110 may be permitted to access the service provider server 140 and/or the resources provided by the service provider server 140. If, however, the signed assertion of continuous user authentication monitor is not verified, the access request may be dropped by the service provider server 140.

Additionally, in embodiments wherein continuous user authentication is required by the user authentication module 206, the credential management module 208 may transmit a notification to the service provider server 140 and/or the key distribution center server 130 in response to the user authentication module 206 determining that the user 102 is no longer authenticated. For example, in some embodiments, the credential management module 208 may transmit a notification message to the service provider server 140 and/or the key distribution center server 130 indicating that the user 102 is no longer authenticated to the client computing device 110 in response to the user authentication module 206 receiving user presence data from the presence monitoring module 204 indicating that the user 102 is no longer located within the reference distance of the location of the client computing device 110. Additionally or alternatively, the credential management module 208 may be configured to transmit a notification message to the service provider server 140 and/or the key distribution center server 130 in response to detecting a change to the user authentication factors (e.g., an increase and/or decrease in verification data strength). In such embodiments the service provider server 140 and/or the key distribution center server 130 may be configured to take preventative actions in response (e.g., drop active connections with the client computing device 110, invalidate service ticket, require new service ticket, etc.).

Figure 3:
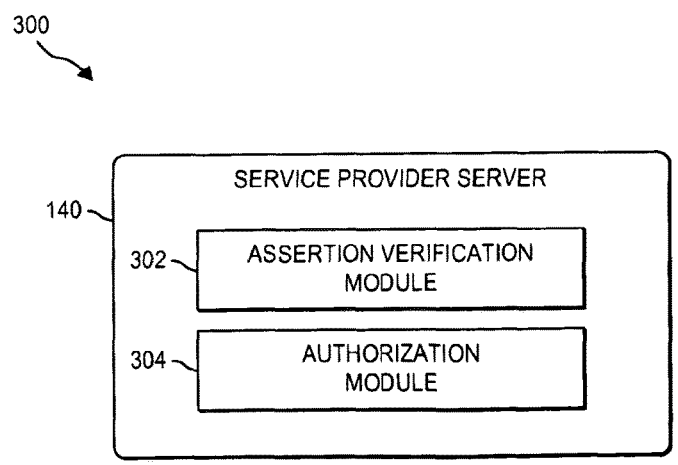
FIG. 3 is a simplified block diagram of at least one embodiment of an environment of the service provider server of the system of FIG. 1.

Referring now to FIG. 3, in use, the service provider server 140 establishes an environment 300 during operation. The illustrative environment 300 includes an assertion verification module 302 and an authorization module 304. Each of the modules 302, 304 of the environment 300 may be embodied as hardware, software, firmware, or a combination thereof. It should be appreciated that the service provider server 140 may include other components, sub-components, modules, and devices commonly found in a server, which are not illustrated in FIG. 3 for clarity of the description.

The assertion verification module 302 may facilitate verifying or otherwise validating the assertions originally provided by the trusted execution environment module 118 of the client computing device 110. As discussed, in some embodiments, the service ticket provided by the key distribution center server 130 may include the signed assertion (e.g., the assertion of continuous user authentication monitoring and/or the assertion of continuous user presence monitoring) originally provided by the trusted execution environment module 118 of the client computing device 110. The signed assertion may be embodied as a signed SAML assertion message and may be verified by the assertion verification module 302 using the user public key, which may also be included within the service ticket provided by the key distribution center server 130.

Additionally, in some embodiments, the assertion verification module 302 may also continue to verify one or more of the assertions originally provided by the trusted execution environment module 118 after initial receipt of the service ticket including the signed assertion. For example, in some embodiments, the assertion verification module 302 may continuously monitor for messages received from the trusted execution environment module 118 indicative of the user 102 no longer being authenticated (e.g., continuous user authentication is lost) to the client computing device 110 and/or the trusted execution environment module 118. As discussed, the trusted execution environment module 118 may be configured to transmit a notification message to the service provider server 140 in response determining that the user 102 is no longer authenticated. For example, in some embodiments, the assertion verification module 302 may determine that the user 102 is no longer authenticated in response to receiving a message from the trusted execution environment module 118 informing that the user 102 is no longer located within the reference distance of the client computing device 110. Additionally or alternatively, the assertion verification module 302 may determine that the user 102 is no longer authenticated in response to receiving a message from the trusted execution environment module 118 informing of a change to one or more of the user authentication factors (e.g., verification data).

The authorization module 304 facilitates determining whether the user 102 and/or the trusted execution environment module 118 of the client computing device 110 is permitted to access one or more resources provided by the service provider server 140. To do so, the authorization module 304 may determine which resources the user 102 and/or the trusted execution environment module 118 is permitted to access via one or more rules or policies included within the service ticket originally provided by the key distribution center server 130. For example, in some embodiment, the service ticket originally provided by the key distribution center server 130 may also include a privilege attribute document (PAD) having one or more security rules and/or policies that define which resources of the service provider server 140 the user 102 and/or the trusted execution environment module 118 is permitted to access.

Figure 4:
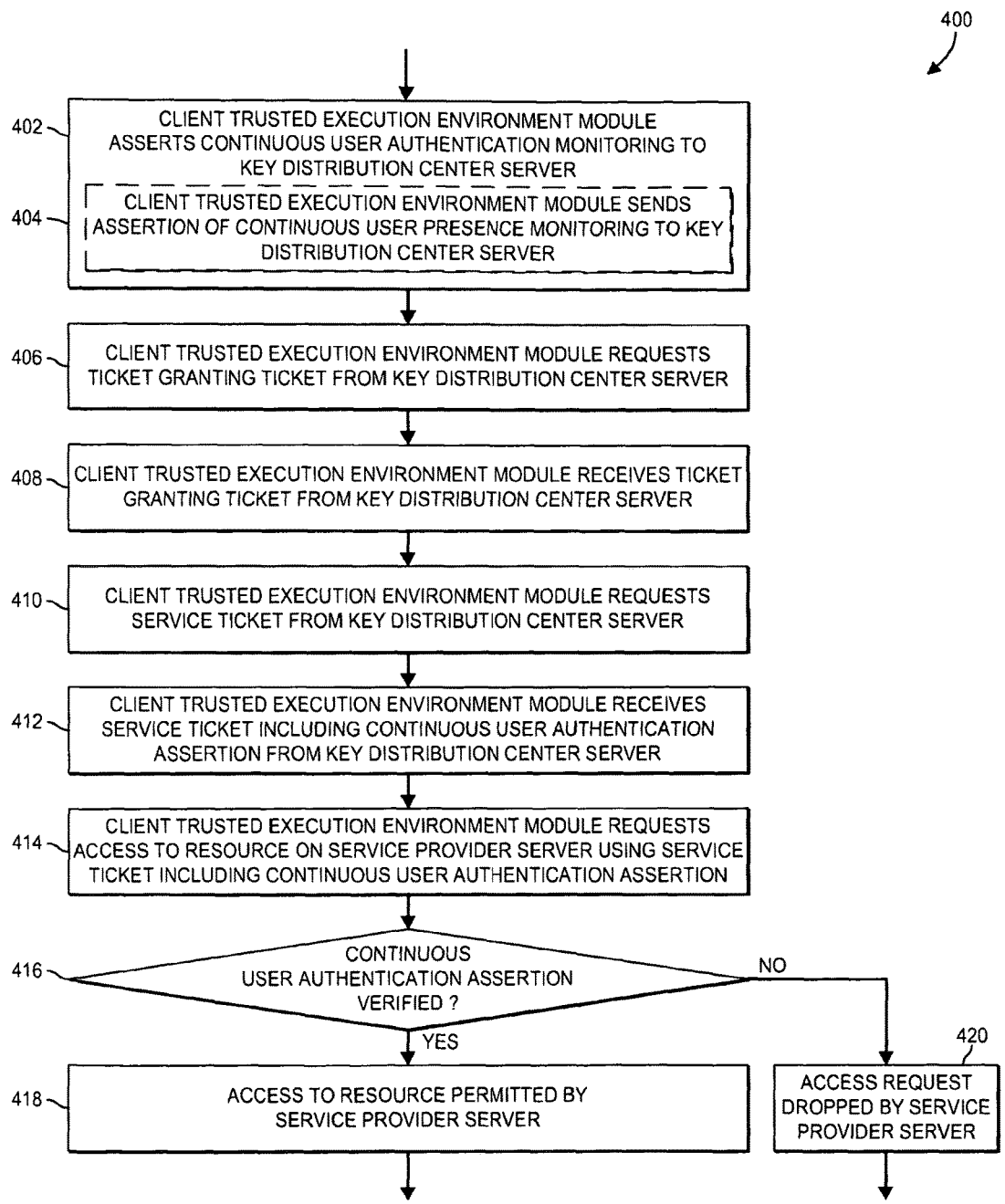
FIG. 4 is a simplified flow diagram of at least one embodiment of a method that may be executed by the computing device of FIGS. 1 and 2 for continuously authenticating a user via multiple authentication factors.

Referring now to FIG. 4, in use, the client computing device 110 of the system 100 may execute a method 400 for continuously authenticating a user via multiple authentication factors. The method 400 begins with block 402 in which the trusted execution environment module 118 asserts continuous user authentication monitoring to the key distribution center server 130. That is, the trusted execution environment module 118 provides an assertion to the key distribution center server 130 that the user's 102 authentication is being continuously monitored by the client computing device 110. In some embodiments, the assertion provided to the key distribution center server 130 may also include information indicative of the factors (e.g., the forms of verification data) used by the trusted execution environment module 118 to authenticate the user 102. Additionally, in some embodiments, the trusted execution environment module 118 may also provide an assertion to the key distribution center server 130 that the continuous presence of the user 102 is being monitored in block 404. The assertion of continuous user authentication monitoring and/or the assertion of continuous user presence monitoring may be sent to the key distribution center server 130 either before or after requesting a ticket granting ticket from the key distribution center server 130 and/or the initial authentication exchange between the trusted execution environment module 118 and the key distribution center server 130. Additionally, in some embodiments, the assertion of continuous user authentication monitoring and/or the assertion of continuous user presence monitoring may be signed using a user private key of a user public/private key pair prior to being sent to the key distribution center server 130. The user public/private key pair may be generated on behalf of the user 102 by the trusted execution environment module 118 in some embodiments.

In block 406, the trusted execution environment module 118 may request a ticket granting ticket from the key distribution center server 130. In some embodiments, if not already completed, the key distribution center server 130 may establish a trust with the trusted execution environment module 118 via one or more key exchanges (e.g., SIGn-and-MAc (SIGMA), Diffie-Hellman, PKINIT, etc.) prior to or contemporaneously with requesting the ticket granting ticket from the key distribution center server 130. In embodiments wherein the assertion of continuous user authentication monitoring and/or the assertion of continuous user presence monitoring is signed using the user private key, the key distribution center server 130 may be provided with the corresponding user public key via the one or more key exchanges. In block 408, the trusted execution environment module 118 receives the ticket granting ticket from the key distribution center server 130 in response. In some embodiments, the ticket granting ticket may include the signed assertion of continuous user authentication monitoring and/or the assertion of continuous user presence monitoring. Such signed assertions may be embodied as one or more signed SAML messages and/or Kerberos safe (KRB_SAFE) messages in some embodiments.

In block 410, the trusted execution environment module 118 requests a service ticket from the key distribution center server 130 for requesting access to the service provider server 140. In some embodiments, the trusted execution environment module 118 sends the ticket granting ticket along with the request for the service ticket to the key distribution center server 130. After sending the request for a service ticket to the key distribution center server 130, the method 400 advances to block 412.

In block 412, the trusted execution environment module 118 receives the service ticket needed to access the service provider server 140 from the key distribution center server 130. In some embodiments, the service ticket includes the signed assertions (e.g., the assertion of continuous user authentication monitoring and/or the assertion of continuous user presence monitoring). Additionally, in some embodiments the service ticket received from the key distribution center server 130 also includes the user public key of the user public/private key pair. As discussed, the key distribution center server 130 may be previously provided with the user public key during a prior key exchange with the trusted execution environment module 118 (e.g., a SIGMA session, PKINIT, etc.).

In block 414, the trusted execution environment module 118 requests access to the service provider server 140 and/or one or more resources provided by the service provider server 140 on behalf of the user 102. To do so, the trusted execution environment module 118 sends the service ticket obtained from the key distribution center server 130 to the service provider server 140. As discussed, the service ticket obtained from the key distribution center server 130 includes the signed assertions originally provided by the trusted execution environment module 118. The service ticket also includes the user public key of the user public/private key pair generated by the trusted execution environment module 118.

At block 416, before the user 102, the trusted execution environment module 118, and/or the client computing device 110 is permitted to access the service provider server 140, it is determined whether the assertion of continuous user authentication monitoring is verified. In such embodiments, the signed assertion of continuous user authentication monitoring included within the service ticket is verified by the service provider server 140 using the user public key included within the service ticket. In embodiments wherein the signed assertion of continuous user authentication monitoring is verified by the service provider server 140, the client computing device 110, the trusted execution environment module 118, and/or the user 102 of the client computing device 110 may be permitted to access the service provider server 140 and/or the resources provided by the service provider server 140 in block 418. If, however, the signed assertion of continuous user authentication monitor is not verified by the service provider server 140, the access request may be dropped by the service provider server 140 in block 420.

Figure 5:
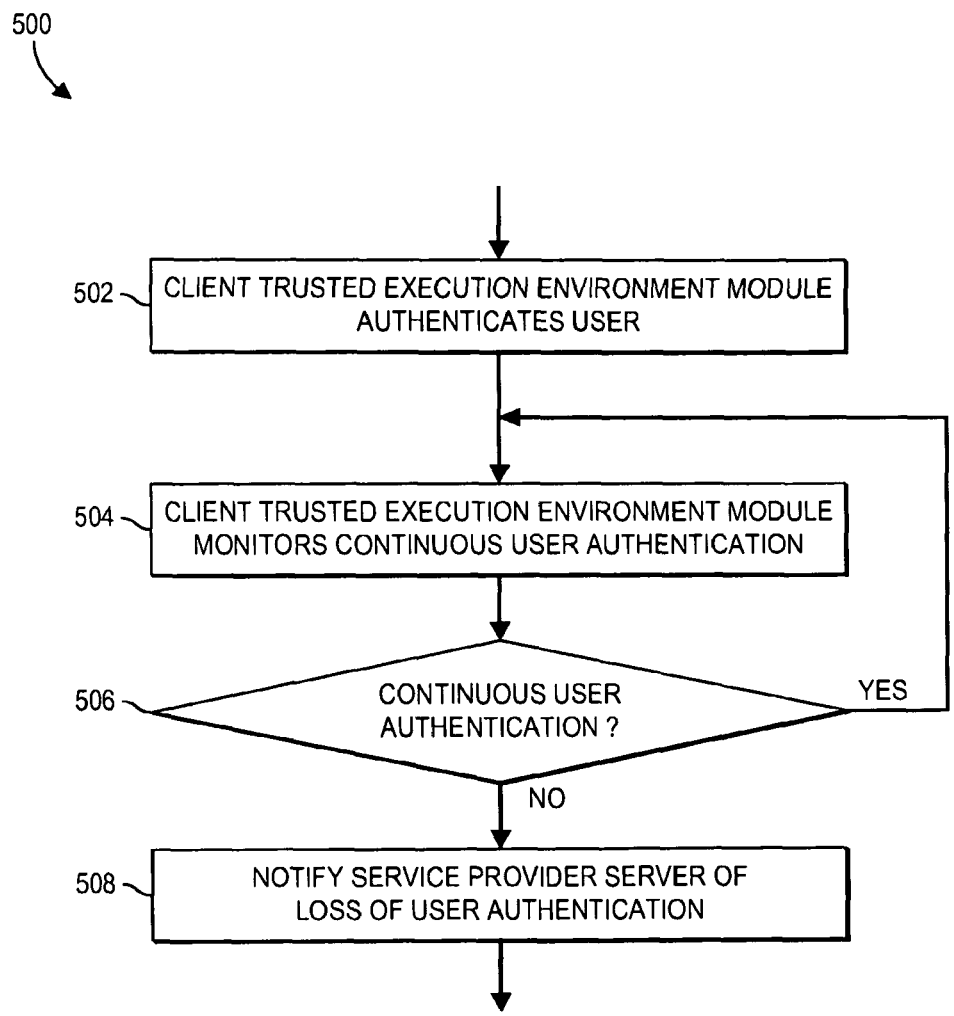
FIG. 5 is a simplified flow diagram of at least one embodiment of a method that may be executed by the computing device of FIGS. 1 and 2 for monitoring continuous user authentication.

Referring now to FIG. 5, in use, the client computing device 110 of the system 100 may execute a method 500 for monitoring continuous user authentication. The method 500 begins with block 502 in which the trusted execution environment module 118 authenticates the user 102 using one or more authentication factors (e.g., verification data provided by the user 102). For example, the user 102 may be required to provide multiple authentication factors (e.g., multiple forms of verification data) to the client computing device 110 in order to prove their identity. The verification data may include data provided by the user 102 via one or more user inputs (e.g., a keyboard, touchpad, touch screen, wireless communication devices, etc.), data received from the one or more sensors 126, and/or user presence data received from the presence monitoring module 204.

In block 504, the trusted execution environment module 118 monitors the continuous authentication of the user 102. For example, in some embodiments, the trusted execution environment module 118 monitors for changes to the user's 102 authentication factors (e.g., increases in strength, decreases in strength, replacements, etc.). Additionally, the trusted execution environment module 118 may monitor for information indicative of the user 102 no longer being present within a reference distance of the client computing device 110. In block 506, the trusted execution environment module 118 determines whether continuous user authentication exists. That is, the trusted execution environment module 118 determines whether the user 102 should still be authenticated to the client computing device 110. In some embodiments, the trusted execution environment module 118 may determine that the user 102 should no longer be authenticated to the client computing device 110 in response to determining that a change to the user's 102 authentication factors has occurred and/or that the user 102 is no longer located within the reference distance of the client computing device 110. If, in block 506, the trusted execution environment module 118 determines that the user 102 should no longer be authenticated to the client computing device 110, the method 500 advances to block 508 in which the trusted execution environment module 118 notifies the service provider server 140 of the loss of continuous user authentication. If, however, the trusted execution environment module 118 determines that the user 102 should still be authenticated to the client computing device 110, the method 500 loops back to block 504 in which the trusted execution environment module 118 continues monitoring the continuous authentication of the user 102.

Figure 6:
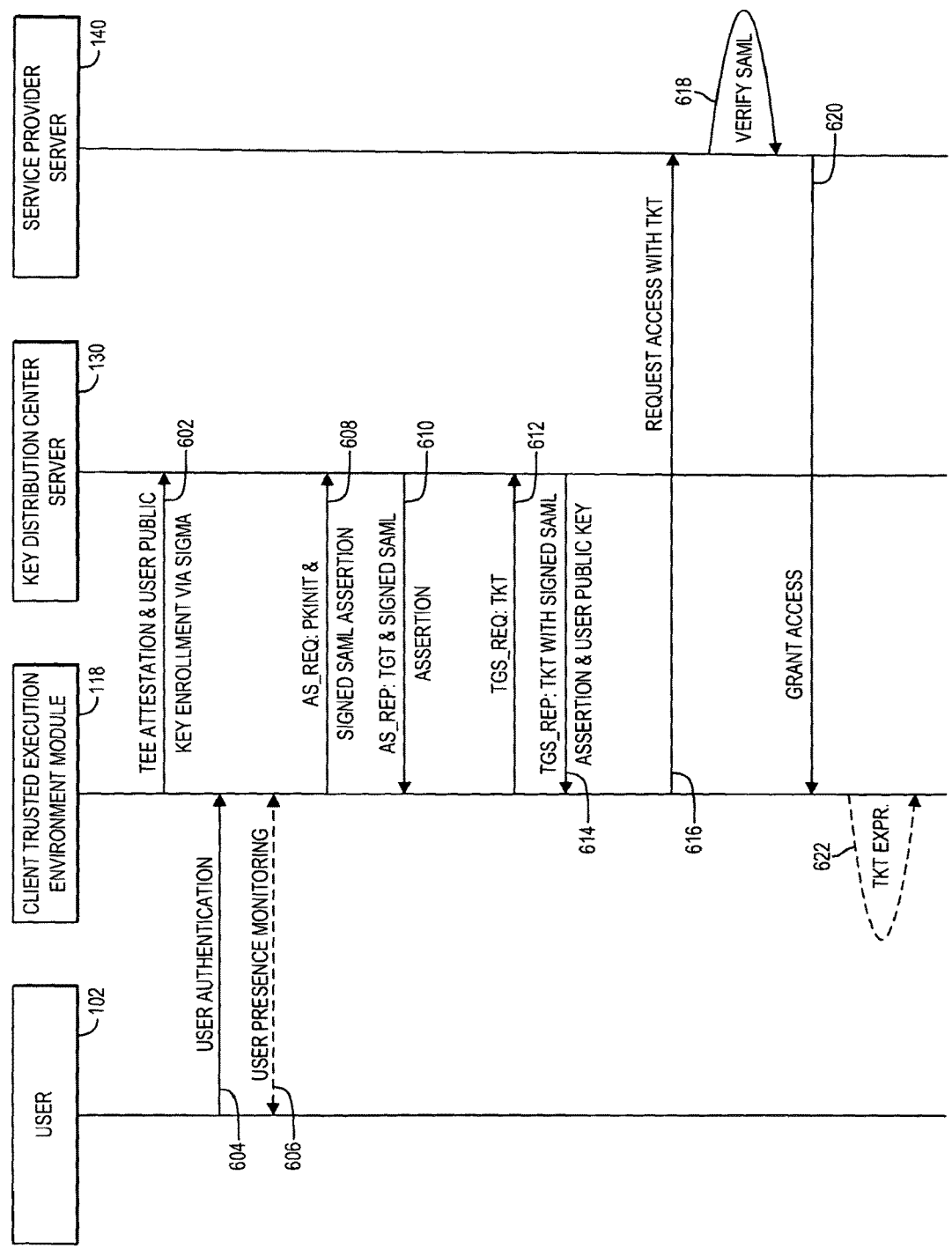
FIG. 6 is a simplified activity flow diagram of at least one embodiment of the methods of FIGS. 4 and 5 for continuously authenticating a user via multiple authentication factors.

Referring now to FIG. 6, a simplified activity flow diagram of at least one embodiment of the methods 400, 500 of FIGS. 4 and 5 for continuously authenticating a user via multiple authentication factors is illustratively shown. In data flow 602, the trusted execution environment module 118 may establish a trust with the key distribution center server 130. To do so, the trusted execution environment module 118 and the key distribution center server 130 may perform one or more key exchanges (e.g., SIGMA sessions, Diffie-Hellman, etc.). In some embodiments, in data flow 602, the trusted execution environment module 118 may also enroll a user public key of a user public/private key pair, which may be generated by the trusted execution environment module 118 on behalf of the user 102.

In data flow 604, the user 102 may be required to authenticate to the trusted execution environment module 118 using one or more authentication factors. In some embodiments, in data flow 604, the user 102 may be required to use multiple authentication factors to prove their identity to the trusted execution environment module 118. In data flow 606, the trusted execution environment module 118 may continuously monitor the presence of the user 102 with respect to the client computing device 110. It should be appreciated that although the trusted execution environment module 118 is shown in the illustrative embodiment as continuously monitoring the presence of the user 102 in data flow 606, the trusted execution environment module 118 may continuously monitor the presence of the user 102 at any time before or after data flow 606. That is, the trusted execution environment module 118 may monitor the presence of the user 102 during any of the data flows 602-622 illustratively shown in FIG. 6.

In data flow 608, the trusted execution environment module 118 may request an initial ticket from the key distribution center server 130. To facilitate secure communications between the trusted execution environment module 118 and the key distribution center server 130 may perform a secure key exchange. For example, in data flow 608, the trusted execution environment module 118 and the key distribution center server 130 may exchange public/private key pairs via PKINT for initial authentication. Additionally, in some embodiments, the trusted execution environment module 118 may generate and send an assertion to the key distribution center server 130 that the continuous authentication of the user 102 is being performed. In some embodiments, the assertion sent by the trusted execution environment module 118 to the key distribution center server 130 may be embodied as a SAML assertion message. The SAML assertion message may be signed with the user private key of the user public/private key pair previously generated by the trusted execution environment module 118. In data flow 610, the key distribution center server 130 may generate and send a ticket granting ticket to the trusted execution environment module 118 in response to the request. In some embodiments, in data flow 610, the ticket granting ticket generated and sent by the key distribution center server 130, may include the signed SAML assertion message originally received from the trusted execution environment module 118.

In response to receiving the ticket granting ticket from the key distribution center server 130, the trusted execution environment module 118 may generate and send a request for a service ticket to the key distribution center server 130 in data flow 612. The request may include the ticket granting ticket received from the key distribution center server 130 in some embodiments. In data flow 614, the key distribution center server 130 may generate and transmit the requested service ticket to the trusted execution environment module 118. The service ticket may include the signed SAML assertion message and, in some embodiments, the user public key originally generated by the trusted execution environment module 118. In data flow 616, the trusted execution environment module 118 may subsequently request access to the service provider server 140 and/or a resource provided by the service provider server 140 using the service ticket received from the key distribution center server 130. As discussed, the service ticket received from the key distribution center server 130 may include the signed SAML assertion message and the user public key generated by the trusted execution environment module 118.

In data flow 618, the service provider server 140 may verify the signed SAML assertion included within the service ticket. To do so, the service provider server 140 may use the user public key, which was also included within the service ticket, to verify the signed SAML assertion message. If the service provider server 140 verifies that the signed SAML assertion is valid, the service provider server 140 may grant access to the trusted execution environment module 118 and/or the user 102 in data flow 620. In some embodiments, the service ticket provided by the key distribution center server 130 may include an expiration time. That is, in some embodiments, the service ticket may be configured to expire after a reference amount of time. It should be understood, however, that the service ticket may also be configured to expire according to any other condition or event. For example, in some embodiments, the service ticket may be configured to expire after a reference number of access requests by the trusted execution environment module 118.

Additionally or alternatively, in some embodiments, the trusted execution environment module 118 may be configured to allow a service ticket to expire in data flow 622. For example, in embodiments wherein the trusted execution environment module 118 determines that continuous user authentication has been lost (e.g., determining that the user 102 is no longer located with the reference distance of the client computing device 110 and/or determining that one or more authentication factors has changed), the trusted execution environment module 118 may determine not to renew the service ticket required to access the service provider server 140. In doing so, the service ticket will expire as discussed above. Additionally, in some embodiments, the trusted execution environment module 118 may be configured to notify the service provider server 140 that continuous user authentication has been lost prior to the expiration of the service ticket. In such embodiments, the trusted execution environment module 118 may send a KRB_SAFE message to the service provider server 140 informing of the loss of continuous user authentication.

In some embodiments, the trusted execution environment module 118 may request access to the service provider server 140 and/or a resource provided by the service provider server 140 without first obtaining a service ticket from the key distribution center server 130. For example, in some embodiments the trusted execution environment module 118 may request access to the service provider server 140 and/or a resource provided by the service provider server 140 prior to the occurrence of any one of data flows 602-614. In such embodiments, the service provider server 140 may request a service ticket be provided by the trusted execution environment module 118 prior to granting access. Subsequently, the trusted execution environment module 118 may request, from the key distribution center server 130, the service ticket required to access the service provider server 140. In response, the service provider server 140 may generate and transmit the requested service ticket to the trusted execution environment module 118. The service ticket may include a signed SAML assertion message previously provided by the trusted execution environment module 118 and, in some embodiments, a user public key corresponding to a user private key used by the trusted execution environment module 118 to sign the SAML assertion message. The trusted execution environment module 118 may subsequently re-request access to the service provider server 140 and/or the resource provided by the service provider server 140 using the service ticket received from the key distribution center server 130.

Figure 7:
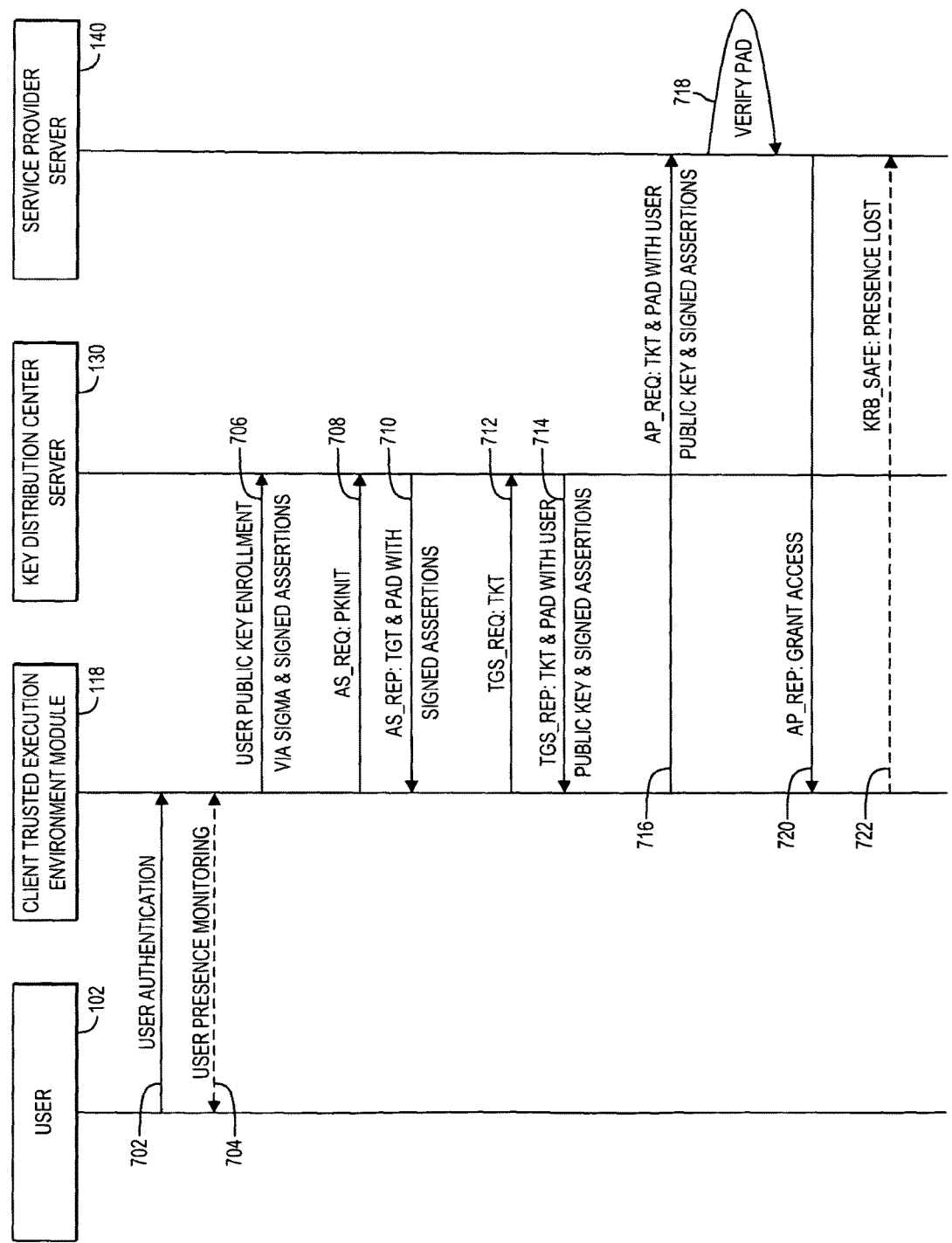
FIG. 7 is a simplified activity flow diagram of another embodiment of the methods of FIGS. 4 and 5 for continuously authenticating a user via multiple authentication factors.

Referring now to FIG. 7, a simplified activity flow diagram of another embodiment of the methods 400, 500 of FIGS. 4 and 5 for continuously authenticating a user via multiple authentication factors is illustratively shown. In data flow 702, the user 102 may be required to authenticate to the trusted execution environment module 118 using one or more authentication factors. In some embodiments, in data flow 702, the user 102 may be required to use multiple authentication factors to prove their identity to the trusted execution environment module 118. In data flow 704, the trusted execution environment module 118 may continuously monitor the presence of the user 102 relative to the client computing device 110. It should be appreciated that although the trusted execution environment module 118 is shown in the illustrative embodiment as continuously monitoring the presence of the user 102 in data flow 704, the trusted execution environment module 118 may continuously monitor the presence of the user 102 at any time before or after data flow 704. That is, the trusted execution environment module 118 may monitor the presence of the user 102 during any of the data flows 702-722 illustratively shown in FIG. 7.

In some embodiments, the trusted execution environment module 118 may generate a user public/private key pair on behalf of the user 102. In such embodiments, the trusted execution environment module 118 may enroll the user public key of the user public/private key pair with the key distribution center server 130 in data flow 706. To do so, the trusted execution environment module 118 may initiate one or more SIGMA sessions with the key distribution center server 130. In some embodiments, the trusted execution environment module 118 may also generate and send, in data flow 706, an assertion to the key distribution center server 130 that the continuous authentication of the user 102 is being monitored. The assertion sent by the trusted execution environment module 118 to the key distribution center server 130 may be signed with the user private key of the user public/private key pair previously generated by the trusted execution environment module 118.

Subsequently, in data flow 708, the trusted execution environment module 118 may request an initial ticket from the key distribution center server 130. To facilitate secure communications between the trusted execution environment module 118 and the key distribution center server 130 may perform a secure key exchange. For example, in data flow 708, the trusted execution environment module 118 and the key distribution center server 130 may exchange public/private key pairs via PKINT for initial authentication.

In data flow 710, the key distribution center server 130 may generate and send a ticket granting ticket to the trusted execution environment module 118 in response to the request from the trusted execution environment module 118. In some embodiments, in data flow 710, the ticket granting ticket generated and sent by the key distribution center server 130 may include the signed assertion message originally received from the trusted execution environment module 118. Additionally, in some embodiments, the ticket granting ticket may include a privilege attribute document (PAD), which may define which resources of the service provider server 140 the user 102 and/or the trusted execution environment module 118 is permitted to access.

In response to receiving the ticket granting ticket from the key distribution center server 130, the trusted execution environment module 118 may generate and send a request for a service ticket to the key distribution center server 130 in data flow 712. The request may include the ticket granting ticket received from the key distribution center server 130 in some embodiments. In data flow 714, the key distribution center server 130 may generate and transmit the requested service ticket to the trusted execution environment module 118. The service ticket may include the signed assertion message and, in some embodiments, the PAD and the user public key originally generated by the trusted execution environment module 118. In data flow 716, the trusted execution environment module 118 may subsequently request access to the service provider server 140 and/or a resource provided by the service provider server 140 using the service ticket received from the key distribution center server 130. As discussed, the service ticket received from the key distribution center server 130 may include the signed assertion message, the user public key generated by the trusted execution environment module 118, and the PAD.

In data flow 718, the service provider server 140 may verify the PAD included within the service ticket. Additionally or alternatively, the service provider server 140 may verify the signed assertion message included within the service ticket. To do so, the service provider server 140 may use the user public key, which was also included within the service ticket, to verify the signed assertion message. If the service provider server 140 verifies that the PAD and/or the signed assertion message is valid, the service provider server 140 may grant access to a requested resource by the trusted execution environment module 118 and/or the user 102 in data flow 720. Additionally, in some embodiments, the trusted execution environment module 118 may be configured to notify the service provider server 140 in response to determining that continuous user authentication no longer exists (e.g., determining that the user 102 is no longer located with the reference proximity distance from the client computing device 110 and/or determining that one or more authentication factors has changed). In such embodiments, the trusted execution environment module 118 may send a KRB_SAFE message to the service provider server 140 informing of the loss of continuous user authentication in data flow 722.

Additionally or alternatively, in some embodiments, the trusted execution environment module 118 may be configured to allow service tickets to expire. For example, in embodiments wherein the trusted execution environment module 118 determines that continuous user authentication has been lost (e.g., determining that the user 102 is no longer located with the reference proximity distance from the client computing device 110 and/or determining that one or more authentication factors has changed), the trusted execution environment module 118 may determine not to renew the service ticket required to access the service provider server 140. In doing so, the service ticket will expire as discussed above. The trusted execution environment module 118 may also be configured to delete service tickets in response to determining that continuous user authentication has been lost.

Additionally, in some embodiments, the trusted execution environment module 118 may be configured to periodically (e.g., at reference intervals) send notifications to the service provider server 140 and/or the key distribution center server 130. For example, the trusted execution environment module 118 may send a KRB_SAFE message to the service provider server 140 and/or the key distribution center server 130 according to the reference interval. In that way, denial of service attacks may be mitigated.

Figure 8:
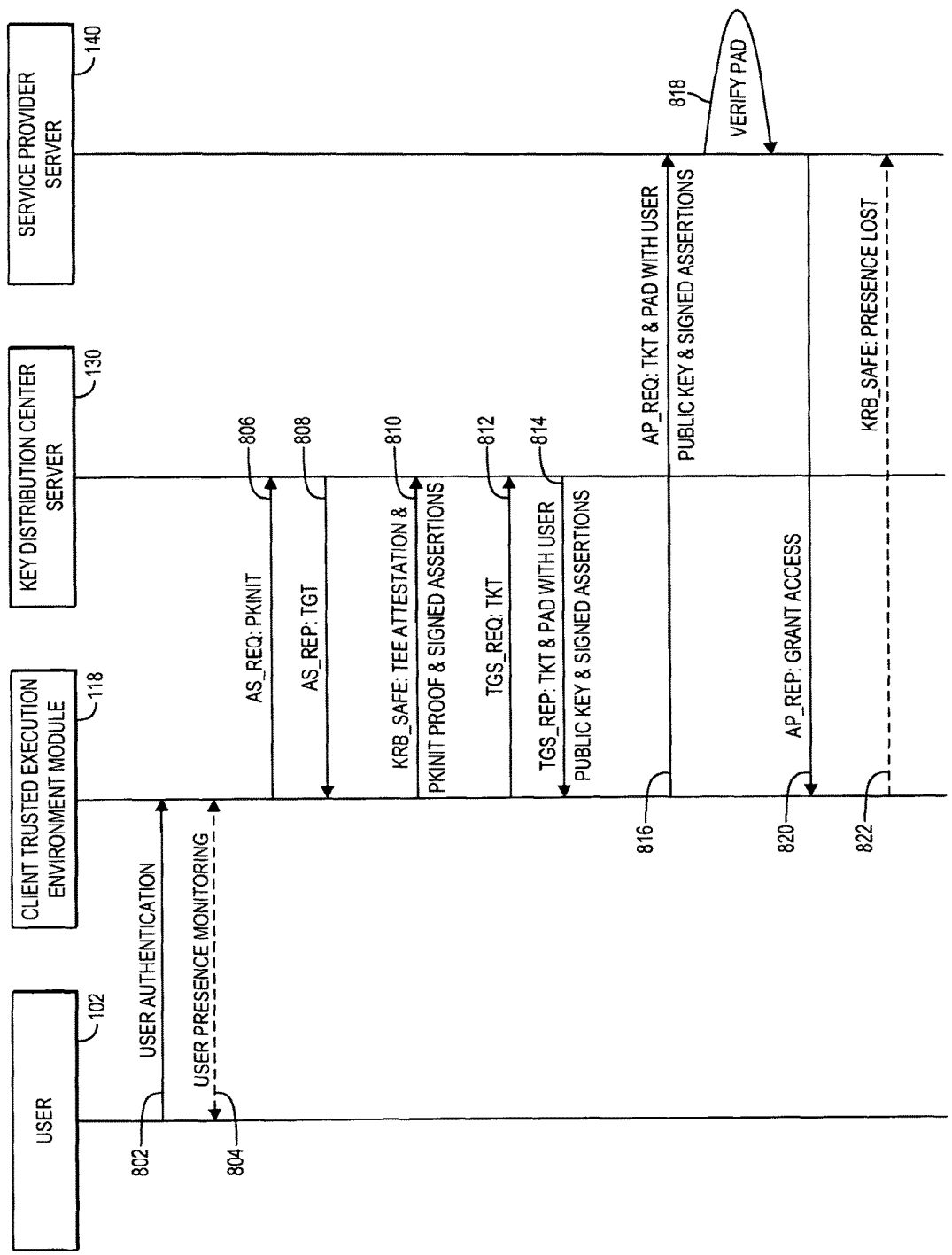
FIG. 8 is a simplified activity flow diagram of another embodiment of the methods of FIGS. 4 and 5 for continuously authenticating a user via multiple authentication factors.

Referring now to FIG. 8, a simplified activity flow diagram of yet another embodiment of the methods 400, 500 of FIGS. 4 and 5 for continuously authenticating a user via multiple authentication factors is illustratively shown. In data flow 802, the user 102 may be required to authenticate to the trusted execution environment module 118 using one or more authentication factors. In some embodiments, in data flow 802, the user 102 may be required to use multiple authentication factors to prove their identity to the trusted execution environment module 118. In data flow 804, the trusted execution environment module 118 may continuously monitor the presence of the user 102 relative to the client computing device 110. It should be appreciated that although the trusted execution environment module 118 is shown in the illustrative embodiment as continuously monitoring the presence of the user 102 in data flow 804, the trusted execution environment module 118 may continuously monitor the presence of the user 102 at any time before or after data flow 804. That is, the trusted execution environment module 118 may monitor the presence of the user 102 during any of the data flows 802-822 illustratively shown in FIG. 8.

In data flow 806, the trusted execution environment module 118 may request an initial ticket from the key distribution center server 130. To facilitate secure communications between the trusted execution environment module 118 and the key distribution center server 130 may perform a secure key exchange. For example, in data flow 806, the trusted execution environment module 118 and the key distribution center server 130 may exchange public/private key pairs via PKINT for initial authentication.

In data flow 808, the key distribution center server 130 may generate and send a ticket granting ticket to the trusted execution environment module 118 in response to the request from the trusted execution environment module 118. Subsequently, in data flow 810, the trusted execution environment module 118 may send one or more KRB_SAFE messages to the key distribution center server 130. In some embodiments, the one or more KRB_SAFE message may include an attestation of the trusted execution environment module 118 to the key distribution center server 130 and proof that a PKINT private key is being protected by the trusted execution environment module 118. In doing so, a trust may be established between the trusted execution environment module 118 and the key distribution center server 130. Additionally, in some embodiments, one or more of the KRB_SAFE message sent to the key distribution center server 130 may also include an assertion generated by the trusted execution environment module 118 indicating that the continuous authentication of the user 102 is being monitored. In some embodiments the one or more KRB_SAFE messages may be sent according to a SIGMA protocol. It should be appreciated that in such embodiments, data flow 810 may be embodied as three (or more) communication exchanges between the trusted execution environment module 118 and the key distribution center server 130 rather than one as illustratively shown in FIG. 8.

As discussed, in some embodiments, the one or more KRB_SAFE messages sent to the key distribution center server 130 may include an assertion generated by the trusted execution environment module 118 indicating that the continuous authentication of the user 102 is being monitored. In such embodiments, the assertion may be signed with a user private key of a user public/private key pair generated by the trusted execution environment module 118 on behalf of the user 102 or it may be signed by a PKINT private key. In embodiments wherein the assertion is signed with a user private key of a user public/private key pair generated by the trusted execution environment module 118, the corresponding user public key of the user public/private key pair may be enrolled with the key distribution center server 130.

The trusted execution environment module 118 may thereafter generate and send a request for a service ticket to the key distribution center server 130 in data flow 812. The request may include the ticket granting ticket received from the key distribution center server 130 in some embodiments. In data flow 814, the key distribution center server 130 may generate and transmit the requested service ticket to the trusted execution environment module 118. The service ticket may include the signed assertion message and, in some embodiments, a privilege attribute document (PAD)

and a public key, which corresponds to the private key used to sign the assertion message. The PAD may define which resources of the service provider server 140 the user 102 and/or the trusted execution environment module 118 is permitted to access.

In data flow 816, the trusted execution environment module 118 may subsequently request access to the service provider server 140 and/or a resource provided by the service provider server 140 using the service ticket received from the key distribution center server 130. As discussed, the service ticket received from the key distribution center server 130 may include the signed assertion message, the public key, and the PAD.

In data flow 818, the service provider server 140 may verify the PAD included within the service ticket. Additionally or alternatively, the service provider server 140 may verify the signed assertion message included within the service ticket. To do so, the service provider server 140 may use the public key, which was also included within the service ticket, to verify the signed assertion message. If the service provider server 140 verifies that the PAD and/or the signed assertion message is valid, the service provider server 140 may grant access to a requested resource by the trusted execution environment module 118 and/or the user 102 in data flow 820. Additionally, in some embodiments, the trusted execution environment module 118 may be configured to notify the service provider server 140 in response to determining that continuous user authentication no longer exists (e.g., determining that the user 102 is no longer located with the reference proximity distance from the client computing device 110 and/or determining that one or more authentication factors has changed). In such embodiments, the trusted execution environment module 118 may send a KRB_SAFE message to the service provider server 140 informing of the loss of continuous user authentication in data flow 822.

Additionally or alternatively, in some embodiments, the trusted execution environment module 118 may be configured to allow service tickets to expire. For example, in embodiments wherein the trusted execution environment module 118 determines that continuous user authentication has been lost (e.g., determining that the user 102 is no longer located with the reference proximity distance from the client computing device 110 and/or determining that one or more authentication factors has changed), the trusted execution environment module 118 may determine not to renew the service ticket required to access the service provider server 140. In doing so, the service ticket will expire as discussed above. The trusted execution environment module 118 may also be configured to delete service tickets in response to determining that continuous user authentication has been lost.

Additionally, in some embodiments, the trusted execution environment module 118 may be configured to periodically (e.g., at reference intervals) send notifications to the service provider server 140 and/or the key distribution center server 130. For example, the trusted execution environment module 118 may send a KRB_SAFE message to the service provider server 140 and/or the key distribution center server 130 according to the reference interval. In that way, denial of service attacks may be mitigated.

Figure 9:
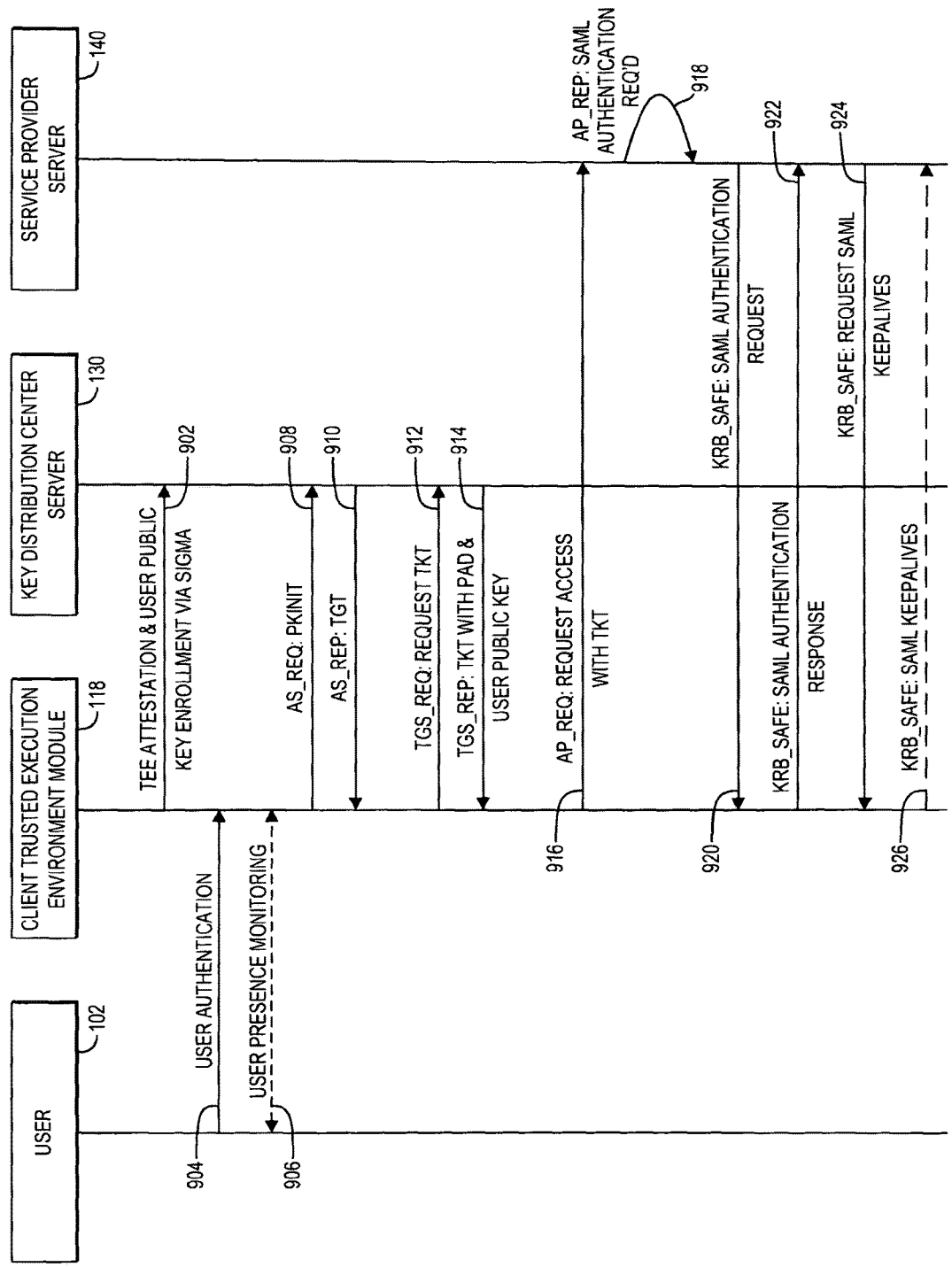
FIG. 9 is a simplified activity flow diagram of another embodiment of the methods of FIGS. 4 and 5 for continuously authenticating a user via multiple authentication factors.

Referring now to FIG. 9, a simplified activity flow diagram of yet another embodiment of the methods 400, 500 of FIGS. 4 and 5 for continuously authenticating a user via multiple authentication factors is illustratively shown. In data flow 902, the trusted execution environment module 118 may establish a trust with the key distribution center server 130. To do so, the trusted execution environment module 118 and the key distribution center server 130 may perform one or more key exchanges (e.g., SIGMA sessions, Diffie-Hellman, etc.) In some embodiments, in data flow 902, the trusted execution environment module 118 may also enroll a user public key of a user public/private key pair, which may be generated by the trusted execution environment module 118 on behalf of the user 102.

In data flow 904, the user 102 may be required to authenticate to the trusted execution environment module 118 using one or more authentication factors. In some embodiments, in data flow 904, the user 102 may be required to use multiple authentication factors to prove their identity to the trusted execution environment module 118. In data flow 906, the trusted execution environment module 118 may continuously monitor the presence of the user 102 with respect to the client computing device 110. It should be appreciated that although the trusted execution environment module 118 is shown in the illustrative embodiment as continuously monitoring the presence of the user 102 in data flow 906, the trusted execution environment module 118 may continuously monitor the presence of the user 102 at any time before or after data flow 906. That is, the trusted execution environment module 118 may monitor the presence of the user 102 during any of the data flows 902-924 illustratively shown in FIG. 9.

In data flow 908, the trusted execution environment module 118 may request an initial ticket from the key distribution center server 130. To facilitate secure communications between the trusted execution environment module 118 and the key distribution center server 130 may perform a secure key exchange. For example, in data flow 908, the trusted execution environment module 118 and the key distribution center server 130 may exchange public/private key pairs via PKINT for initial authentication. In data flow 910, the key distribution center server 130 may generate and send a ticket granting ticket to the trusted execution environment module 118 in response to the request from the trusted execution environment module 118.

The trusted execution environment module 118 may thereafter generate and send a request for a service ticket to the key distribution center server 130 in data flow 912. The request may include the ticket granting ticket received from the key distribution center server 130 in some embodiments. In data flow 914, the key distribution center server 130 may generate and transmit the requested service ticket to the trusted execution environment module 118. The service ticket may include a privilege attribute document (PAD) and the user public key of the user public/private key pair, which was previously generated by the trusted execution environment module 118.

In data flow 916, the trusted execution environment module 118 may subsequently request access to the service provider server 140 and/or a resource provided by the service provider server 140 using the service ticket received from the key distribution center server 130. As discussed, the service ticket received from the key distribution center server 130 may include the PAD and the user public key. In response to receiving the request for access, the service provider server 140 may be configured to determine that authentication is required by the trusted execution environment module 118 in data flow 918. If the service provider server 140 determines that authentication is required, the trusted execution environment module 118 and/or the user 102 may be authenticated via one or more SAML messages (e.g., data flows 920-926) between the trusted execution environment module 118 and the service provider server 140. For example, in some embodiments, the service provider server 140 may send a SAML authentication request to the trusted execution environment module 118 in data flow 920. Subsequently, in data flow 922, the trusted execution environment module 118 may send a SAML authentication response to the service provider server 140.

In some embodiments, in data flow 924, the service provider server 140 may also request the trusted execution environment module 118 to periodically (e.g., at reference intervals) send SAML keepalive messages to facilitate mitigating denial of service attacks. Such keepalive messages may be required by the service provider server 140 based at least in part on, or otherwise as a function of, the PAD generated by the key distribution center server 130. In response to receiving such a request, the trusted execution environment module 118 may periodically (e.g., at reference intervals) send a SAML keepalive message to the service provider server 140 in data flow 926. In some embodiments, one or more KRB_SAFE message exchanges may be used to communicate the one or more SAML messages (e.g., data flows 920-926) between the trusted execution environment module 118 and the service provider server 140.

In some embodiments, the trusted execution environment module 118 may be configured to stop sending SAML keepalive messages to the service provider server 140. For example, in some embodiments, the trusted execution environment module 118 may be configured to stop sending SAML keepalive messages to the service provider server 140 in response to determining that continuous user authentication has been lost (e.g., determining that the user 102 is no longer located with the reference proximity distance from the client computing device 110 and/or determining that one or more authentication factors has changed). In such embodiments, the service provider server 140 may be configured to prevent access by the trusted execution environment module 118 and/or the user 102 after a reference number of expected SAML keepalive messages are not received and/or after the expiration of a timer (e.g., expiration of a reference time-out period).

Additionally or alternatively, in some embodiments, the trusted execution environment module 118 may be configured to delete service tickets. For example, in embodiments wherein the trusted execution environment module 118 determines that continuous user authentication has been lost (e.g., determining that the user 102 is no longer located with the reference proximity distance from the client computing device 110 and/or determining that one or more authentication factors has changed), the trusted execution environment module 118 may delete or otherwise invalidate the service ticket required to access the service provider server 140. In doing so, further access to the service provider server 140 by the trusted execution environment module 118 and/or the user 102 may be prevented.

Illustrative examples of the technologies disclosed herein are provided below. An embodiment of the technologies may include any one or more, and any combination of the examples described below.

Example 1 includes a computing device to continuously authenticate a user via multiple authentication factors, the computing device includes a trusted execution environment module to (i) generate a continuous authentication assertion to indicate that continuous authentication of a user is monitored; (ii) send the continuous authentication assertion to a key distribution center server; (iii) request an initial ticket from the key distribution center server; (iv) receive the initial ticket from the key distribution center server; (v) request a service ticket from the key distribution center server required to access a service provider server; (vi) receive the service ticket from the key distribution center server required to access the service provider server, wherein the service ticket includes the continuous authentication assertion; (vii) request access to the service provider server with the service ticket; and (viii) access the service provider server in response to verification of the continuous authentication assertion.

Example 2 includes the subject matter of Example 1, and wherein the trusted execution environment module is further to (i) authenticate the user via a plurality of authentication factors; (ii) monitor the continuous authentication of the user; (iii) determine whether the user should still be authenticated; and (iv) notify the service provider server of a loss of the continuous authentication of the user in response to a determination that the user should no longer be authenticated.

Example 3 includes the subject matter of any of Examples 1 and 2, and wherein to notify the service provider server of a loss of the continuous authentication of the user includes to send a notification message to the service provider server to inform of the loss of the continuous authentication of the user.

Example 4 includes the subject matter of any of Examples 1-3, and wherein the notification message includes a Kerberos message.

Example 5 includes the subject matter of any of Examples 1-4, and wherein the Kerberos message includes a Kerberos safe message.

Example 6 includes the subject matter of any of Examples 1-5, and wherein the trusted execution environment module is further to delete the service ticket in response to the determination that the user should no longer be authenticated.

Example 7 includes the subject matter of any of Examples 1-6, and wherein the trusted execution environment module is further to permit the service ticket to expire in response to the determination that the user should no longer be authenticated.

Example 8 includes the subject matter of any of Examples 1-7, and wherein to permit the service ticket to expire includes to not renew the service ticket in response to the determination that the user should no longer be authenticated.

Example 9 includes the subject matter of any of Examples 1-8, and further including one or more sensors to capture user characteristic data; and wherein to authenticate the user via a plurality of authentication factors includes to authenticate the user as a function of the user characteristic data captured by the one or more sensors.

Example 10 includes the subject matter of any of Examples 1-9, and wherein the trusted execution environment module is further to (i) monitor a presence of the user relative to the computing device; (ii) generate a continuous presence assertion to indicate that continuous presence of the user relative to the computing device is monitored; (iii) send the continuous presence assertion to the key distribution center server; (iv) determine whether the user is present relative to the computing device; and (iv) notify the service provider server of a loss of the continuous presence of the user relative to the computing device in response to a determination that the user is not present relative to the computing device.

Example 11 includes the subject matter of any of Examples 1-10, and wherein to notify the service provider server of a loss of the continuous presence of the user relative to the computing device includes to send a notification message to the service provider server to inform of the loss of the continuous presence of the user relative to the computing device.

Example 12 includes the subject matter of any of Examples 1-11, and wherein the notification message includes a Kerberos safe message.

Example 13 includes the subject matter of any of Examples 1-12, and wherein the trusted execution environment module is further to send a Kerberos safe message to the service provider server at a reference interval.

Example 14 includes the subject matter of any of Examples 1-13, and wherein the trusted execution environment module is further to (i) generate a user key pair on behalf of the user, wherein the user key pair includes a user public key and a user private key generated on behalf of the user; (ii) provide the user public key to the key distribution center server via a secure key exchange; and (iii) sign the continuous authentication assertion with the user private key prior to the continuous authentication assertion being sent to the key distribution center server; and wherein to send the continuous authentication assertion to the key distribution center server includes to send the signed continuous authentication assertion to the key distribution center server; and wherein the service ticket received from the key distribution center server includes the signed continuous authentication assertion and the user public key.

Example 15 includes the subject matter of any of Examples 1-14, and wherein to provide the user public key to the key distribution center server via a secure key exchange includes to provide the user public key to the key distribution center server via a SIGn-and-MAc session.

Example 16 includes the subject matter of any of Examples 1-15, and wherein the service ticket received from the key distribution center server further includes a privilege attribute document, the privilege attribute document includes one or more policies required to access the service provider server.

Example 17 includes the subject matter of any of Examples 1-16, and wherein to request an initial ticket from the key distribution center server includes to request a ticket granting ticket from the key distribution center server; and wherein to receive the initial ticket from the key distribution center server includes to receive the ticket granting ticket from the key distribution center server.

Example 18 includes the subject matter of any of Examples 1-17, and wherein the continuous authentication assertion includes at least one of a Kerberos safe message or a security assertion markup language message.

Example 19 includes a method for continuously authenticating a user via multiple authentication factors, the method includes (i) generating, on a trusted execution environment module of a computing device, a continuous authentication assertion indicating that continuous authentication of a user is being monitored; (ii) sending, on the trusted execution environment module, the continuous authentication assertion to a key distribution center server; (iii) requesting, on the trusted execution environment module, an initial ticket from the key distribution center server; (iv) receiving, on the trusted execution environment module, the initial ticket from the key distribution center server; (v) requesting, on the trusted execution environment module, a service ticket from the key distribution center server for accessing a service provider server; (vi) receiving, on the trusted execution environment module, the service ticket from the key distribution center server for accessing the service provider server, wherein the service ticket includes the continuous authentication assertion; (vii) requesting, on the trusted execution environment module, access to the service provider server with the service ticket includes the continuous authentication assertion; and (viii) accessing, on the trusted execution environment module, the service provider server in response to the continuous authentication assertion being verified.

Example 20 includes the subject matter of Example 19, and further includes (i) authenticating, on the trusted execution environment module, the user via a plurality of authentication factors; (ii) monitoring, on the trusted execution environment module, the continuous authentication of the user; (iii) determining, on the trusted execution environment module, whether the user should still be authenticated; and (iv) notifying, on the trusted execution environment module, the service provider server of a loss of the continuous authentication of the user in response to determining that the user should no longer be authenticated.

Example 21 includes the subject matter of any of Examples 19 and 20, and wherein notifying the service provider server of a loss of the continuous authentication of the user includes sending a notification message to the service provider server informing of the loss of the continuous authentication of the user.

Example 22 includes the subject matter of any of Examples 19-21, and wherein the notification message includes a Kerberos safe message.

Example 23 includes the subject matter of any of Examples 19-22, and further includes deleting, on the trusted execution environment module, the service ticket in response to determining that the user should no longer be authenticated.

Example 24 includes the subject matter of any of Examples 19-23, and further includes permitting, on the trusted execution environment module, the service ticket to expire in response to determining that the user should no longer be authenticated.

Example 25 includes the subject matter of any of Examples 19-24, and wherein permitting the service ticket to expire includes not renewing the service ticket in response to determining that the user should no longer be authenticated.

Example 26 includes the subject matter of any of Examples 19-25, and further includes receiving, on the trusted execution environment module, user characteristic data captured by one or more sensors; and wherein authenticating the user via a plurality of authentication factors includes authenticating user as a function of the user characteristic data captured by the one or more sensors.

Example 27 includes the subject matter of any of Examples 19-26, and further includes (i) monitoring, on the trusted execution environment module, a presence of the user relative to the computing device; (ii) generating, on the trusted execution environment module, a continuous presence assertion indicating that continuous presence of the user relative to the computing device is being monitored; (iii) sending, on the trusted execution environment module, the continuous presence assertion to the key distribution center server; (iv) determining, on the trusted execution environment module, whether the user is present relative to the computing device; and (v) notifying, on the trusted execution environment module, the service provider server of a loss of the continuous presence of the user relative to the computing device in response to determining that the user is not present relative to the computing device.

Example 28 includes the subject matter of any of Examples 19-27, and wherein notifying the service provider server of a loss of the continuous presence of the user relative to the computing device includes sending a notification message to the service provider server informing of the loss of the continuous presence of the user relative to the computing device.

Example 29 includes the subject matter of any of Examples 19-28, and wherein the notification message includes a Kerberos safe message.

Example 30 includes the subject matter of any of Examples 19-29, and further includes sending, on the trusted execution environment module, a Kerberos safe message to the service provider server at a reference interval.

Example 31 includes the subject matter of any of Examples 19-30, and further includes (i) generating, on the trusted execution environment module, a user key pair on behalf of the user, wherein the user key pair includes a user public key and a user private key generated on behalf of the user; (ii) providing, on the trusted execution environment module, the user public key to the key distribution center server via a secure key exchange; and (iii) signing, on the trusted execution environment module, the continuous authentication assertion with the user private key prior to sending the continuous authentication assertion to the key distribution center server; and wherein sending the continuous authentication assertion to the key distribution center server includes sending the signed continuous authentication assertion to the key distribution center server; and wherein the service ticket received from the key distribution center server includes the signed continuous authentication assertion and the user public key.

Example 32 includes the subject matter of any of Examples 19-31, and wherein providing the user public key to the key distribution center server via a secure key exchange includes providing the user public key to the key distribution center server via a SIGn-and-MAc session.

Example 33 includes the subject matter of any of Examples 19-32, and wherein the service ticket received from the key distribution center server further includes a privilege attribute document, the privilege attribute document includes one or more policies required for accessing the service provider server.

Example 34 includes the subject matter of any of Examples 19-33, and wherein requesting an initial ticket from the key distribution center server includes requesting a ticket granting ticket from the key distribution center server; and wherein receiving the initial ticket from the key distribution center server includes receiving the ticket granting ticket from the key distribution center server.

Example 35 includes the subject matter of any of Examples 19-34, and wherein the continuous authentication assertion includes at least one of a Kerberos safe message or a security assertion markup language message.

Example 36 includes a computing device to continuously authenticate a user via multiple authentication factors, the computing device includes a processor; and a memory having stored therein a plurality of instructions that when executed by the processor cause the computing device to perform the method of any of Examples 19-35.

Example 37 includes one or more machine readable media including a plurality of instructions stored thereon that in response to being executed result in a computing device performing the method of any of Examples 19-35.

Example 38 includes a computing device to continuously authenticate a user via multiple authentication factors, the computing device includes means for performing the method of any of Examples 19-35.

Example 39 includes a computing device to continuously authenticate a user via multiple authentication factors, the computing device includes a processor; and a memory having stored therein a plurality of instructions that when executed by the processor cause the computing device to (i) generate a continuous authentication assertion to indicate that continuous authentication of a user is monitored; (ii) send the continuous authentication assertion to a key distribution center server; (iii) request an initial ticket from the key distribution center server; (iv) receive the initial ticket from the key distribution center server; (v) request a service ticket from the key distribution center server required to access a service provider server; (vi) receive the service ticket from the key distribution center server required to access the service provider server, wherein the service ticket includes the continuous authentication assertion; (vii) request access to the service provider server with the service ticket; and (viii) access the service provider server in response to verification of the continuous authentication assertion.

Example 40 includes the subject matter of Example 39, and wherein the plurality of instructions further cause the computing device to (i) authenticate the user via a plurality of authentication factors; (ii) monitor the continuous authentication of the user; (iii) determine whether the user should still be authenticated; and (iv) notify the service provider server of a loss of the continuous authentication of the user in response to a determination that the user should no longer be authenticated.

Example 41 includes the subject matter of any of Examples 39 and 40, and wherein to notify the service provider server of a loss of the continuous authentication of the user includes to send a notification message to the service provider server to inform of the loss of the continuous authentication of the user.

Example 42 includes the subject matter of any of Examples 39-41, and wherein the notification message includes a Kerberos message.

Example 43 includes the subject matter of any of Examples 39-42, and wherein the Kerberos message includes a Kerberos safe message.

Example 44 includes the subject matter of any of Examples 39-43, and wherein the plurality of instructions further cause the computing device to delete the service ticket in response to the determination that the user should no longer be authenticated.

Example 45 includes the subject matter of any of Examples 39-44, and wherein the plurality of instructions further cause the computing device to permit the service ticket to expire in response to the determination that the user should no longer be authenticated.

Example 46 includes the subject matter of any of Examples 39-45, and wherein to permit the service ticket to expire includes to not renew the service ticket in response to the determination that the user should no longer be authenticated.

Example 47 includes the subject matter of any of Examples 39-46, and further includes one or more sensors to capture user characteristic data; and wherein to authenticate the user via a plurality of authentication factors includes to authenticate the user as a function of the user characteristic data captured by the one or more sensors.

Example 48 includes the subject matter of any of Examples 39-47, and wherein the plurality of instructions further cause the computing device to (i) monitor a presence of the user relative to the computing device; (ii) generate a continuous presence assertion to indicate that continuous presence of the user relative to the computing device is monitored; (iii) send the continuous presence assertion to the key distribution center server; (iv) determine whether the user is present relative to the computing device; and (v) notify the service provider server of a loss of the continuous presence of the user relative to the computing device in response to a determination that the user is not present relative to the computing device.

Example 49 includes the subject matter of any of Examples 39-48, and wherein to notify the service provider server of a loss of the continuous presence of the user relative to the computing device includes to send a notification message to the service provider server to inform of the loss of the continuous presence of the user relative to the computing device.

Example 50 includes the subject matter of any of Examples 39-49, and wherein the notification message includes a Kerberos message.

Example 51 includes the subject matter of any of Examples 39-50, and where the Kerberos message includes a Kerberos safe message.

Example 52 includes the subject matter of any of Examples 39-51, and wherein the plurality of instructions further cause the computing device to send a Kerberos safe message to the service provider server at a reference interval.

Example 53 includes the subject matter of any of Examples 39-52, and wherein the plurality of instructions further cause the computing device to (i) generate a user key pair on behalf of the user, wherein the user key pair includes a user public key and a user private key generated on behalf of the user; (ii) provide the user public key to the key distribution center server via a secure key exchange; and (iii) sign the continuous authentication assertion with the user private key prior to the continuous authentication assertion being sent to the key distribution center server; wherein to send the continuous authentication assertion to the key distribution center server includes to send the signed continuous authentication assertion to the key distribution center server; and wherein the service ticket received from the key distribution center server includes the signed continuous authentication assertion and the user public key.

Example 54 includes the subject matter of any of Examples 39-53, and wherein to provide the user public key to the key distribution center server via a secure key exchange includes to provide the user public key to the key distribution center server via a SIGn-and-MAc session.

Example 55 includes the subject matter of any of Examples 39-54, and wherein the service ticket received from the key distribution center server further includes a privilege attribute document, the privilege attribute document includes one or more policies required to access the service provider server.

Example 56 includes the subject matter of any of Examples 39-55, and wherein to request an initial ticket from the key distribution center server includes to request a ticket granting ticket from the key distribution center server; and wherein to receive the initial ticket from the key distribution center server includes to receive the ticket granting ticket from the key distribution center server.

Example 57 includes the subject matter of any of Examples 39-56, and wherein the continuous authentication assertion includes at least one of a Kerberos safe message or a security assertion markup language message.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computing device comprising:
   processor;
   a non-transitory machine-readable medium communicatively coupled to the processor; and
   instructions in the machine-readable medium which, when executed by the processor, enable the computing device to:
   generate a continuous authentication assertion which indicates that the computing device is continuously monitoring authentication of a user according to a reference time interval, wherein the continuous authentication assertion comprises factor information identifying at least one authenticate factor that was used to authenticate the user;
   send the continuous authentication assertion to a key distribution center server;
   after sending the continuous authentication assertion to the key distribution center server, receive a ticket from the key distribution center server; and
   after receiving the ticket from the key distribution center server, use the ticket to obtain access to a service provider server.

2. A computing device according to claim 1, wherein:
   the ticket comprises the continuous authentication assertion; and
   the operation of using the ticket to obtain access to a service provider server comprises:
   requesting access to the service provider server by sending the ticket with the continuous authentication assertion to the service provider server; and
   obtaining access to the service provider server after the service provider server has verified the continuous authentication assertion.

3. A computing device according to claim 2, wherein:
   the processor comprises a security co-processor;
   the computing device further comprises:
   memory communicatively coupled to the security co-processor; and
   a second processor communicatively coupled to the memory; and
   the security co-processor is configured to use a portion of the memory that is not accessible to the second processor to store one or more encryption keys that facilitate secure communication between the security co-processor and the key distribution center server.

4. A computing device according to claim 3, wherein:
   the security co-processor comprises a trusted execution environment module; and
   the instructions in the machine-readable medium comprise instructions which, when executed by the trusted execution environment module, enable the trusted execution environment module to:
   authenticate the user with multiple authentication factors before generating the continuous authentication assertion;
   monitor continuous authentication of the user;
   determine whether the user should remain authenticated; and
   notify the service provider server of a loss of the continuous authentication of the user in response to a determination that the user should not remain authenticated.

29

5. A computing device according to claim 1, wherein:
the ticket from the key distribution center server comprises a service ticket;
the instructions, when executed, further enable the computing device to:
before receiving the service ticket from the key distribution center server, receive an initial ticket from the key distribution center server; and
use the initial ticket to request the service ticket from the key distribution center server; and
the instructions, when executed, enable the computing device to send the continuous authentication assertion to the key distribution center server before receiving the initial ticket from the key distribution center server.

6. A computing device according to claim 1, wherein the instructions, when executed, further enable the computing device to:
authenticate the user with multiple authentication factors before generating the continuous authentication assertion;
monitor continuous authentication of the user;
determine whether the user should remain authenticated; and
notify the service provider server of a loss of the continuous authentication of the user in response to a determination that the user should not remain authenticated.

7. A computing device according to claim 1, wherein the instructions, when executed, further enable the computing device to:
monitor presence of the user relative to the computing device;
generate a continuous presence assertion to indicate that continuous presence of the user relative to the computing device is monitored;
send the continuous presence assertion to the key distribution center server;
determine whether the user remains present relative to the computing device; and
notify the service provider server of a loss of the continuous presence of the user relative to the computing device in response to a determination that the user did not remain present relative to the computing device.

8. An apparatus comprising:
at least one non-transitory machine-readable medium; and
instructions in the machine-readable medium that, in response to being executed by a computing device, enable the computing device to:
generate a continuous authentication assertion which indicates that the computing device is continuously monitoring authentication of a user according to a reference time interval, wherein the continuous authentication assertion comprises factor information identifying at least one authenticate factor that was used to authenticate the user;
send the continuous authentication assertion to a key distribution center server;
after sending the continuous authentication assertion to the key distribution center server, receive a ticket from the key distribution center server; and
after receiving the ticket from the key distribution center server, use the ticket to obtain access to a service provider server.

9. An apparatus according to claim 8, wherein:
the ticket comprises the continuous authentication assertion; and

30 the operation of using the ticket to obtain access to a service provider server comprises:
requesting access to the service provider server by sending the ticket with the continuous authentication assertion to the service provider server; and
obtaining access to the service provider server after the service provider server has verified the continuous authentication assertion.

10. An apparatus according to claim 9, wherein:
the instructions that enable the computing device to generate the continuous authentication assertion, send the continuous authentication assertion to the key distribution center server, receive the ticket from the key distribution center server, and use the ticket to obtain access to a service provider server are adapted to be executed by a security co-processor in the computing device; and
the instructions in the machine-readable medium enable the security co-processor to use a portion of memory of the computing device that is accessible to the security co-processor but that is not accessible to another processor in the computing device to store one or more encryption keys that facilitate secure communication between the security co-processor and the key distribution center server.

11. An apparatus according to claim 8, wherein:
the ticket from the key distribution center server comprises a service ticket;
the instructions, when executed, further enable the computing device to:
before receiving the service ticket from the key distribution center server, receive an initial ticket from the key distribution center server; and
use the initial ticket to request the service ticket from the key distribution center server; and
the instructions, when executed, cause the computing device to send the continuous authentication assertion to the key distribution center server before receiving the initial ticket from the key distribution center server.

12. An apparatus according to claim 8, wherein the instructions, when executed, further enable the computing device to:
authenticate the user with multiple authentication factors before generating the continuous authentication assertion;
monitor continuous authentication of the user;
determine whether the user should remain authenticated; and
notify the service provider server of a loss of the continuous authentication of the user in response to a determination that the user should not remain authenticated.

13. An apparatus according to claim 8, wherein the instructions, when executed, further enable the computing device to:
monitor presence of the user relative to the computing device;
generate a continuous presence assertion to indicate that continuous presence of the user relative to the computing device is monitored;
send the continuous presence assertion to the key distribution center server;
determine whether the user remains present relative to the computing device; and
notify the service provider server of a loss of the continuous presence of the user relative to the computing device in response to a determination that the user did not remain present relative to the computing device.

14. A method comprising:

at a computing device, generating a continuous authentication assertion which indicates that the computing device is continuously monitoring authentication of a user according to a reference time interval, wherein the continuous authentication assertion comprises factor information identifying at least one authenticate factor that was used to authenticate the user;

sending the continuous authentication assertion to a key distribution center server;

after sending the continuous authentication assertion to the key distribution center server, receiving a ticket from the key distribution center server; and after receiving the ticket from the key distribution center server, using the ticket to obtain access to a service provider server.

15. A method according to claim 14, wherein:

the ticket comprises the continuous authentication assertion; and the operation of using the ticket to obtain access to a service provider server comprises:

requesting access to the service provider server by sending the ticket with the continuous authentication assertion to the service provider server; and obtaining access to the service provider server after the service provider server has verified the continuous authentication assertion.

16. A method according to claim 15, wherein:

the operations of generating the continuous authentication assertion, sending the continuous authentication assertion to the key distribution center server, receiving the ticket from the key distribution center server, and using the ticket to obtain access to a service provider server are managed by a security co-processor in the computing device; and the method comprises using a portion of memory of the computing device that is accessible to the security co-processor but that is not accessible to another processor in the computing device to store one or more encryption keys that facilitate secure communication between the security co-processor and the key distribution center server.

17. A method according to claim 16, wherein:

the security co-processor comprises a trusted execution environment module;

the method further comprises:

authenticating the user with multiple authentication factors before generating the continuous authentication assertion;

monitoring continuous authentication of the user;

determining whether the user should remain authenticated; and notifying the service provider server of a loss of the continuous authentication of the user in response to a determination that the user should not remain authenticated; and the operations of authenticating the user, monitoring continuous authentication of the user, determining whether the user should remain authenticated, and notifying the service provider server of a loss of the continuous authentication of the user are managed by the trusted execution environment module.

18. A method according to claim 14, wherein:

the ticket from the key distribution center server comprises a service ticket;

the method further comprises:

before receiving the service ticket from the key distribution center server, receiving an initial ticket from the key distribution center server; and using the initial ticket to request the service ticket from the key distribution center server; and the operation of sending the continuous authentication assertion to the key distribution center server is performed before receiving the initial ticket from the key distribution center server.

19. A method according to claim 14, further comprising:

authenticating the user with multiple authentication factors before generating the continuous authentication assertion;

monitoring continuous authentication of the user;

determining whether the user should remain authenticated; and notifying the service provider server of a loss of the continuous authentication of the user in response to a determination that the user should not remain authenticated.

20. A method according to claim 14, further comprising:

monitoring presence of the user relative to the computing device;

generating a continuous presence assertion to indicate that continuous presence of the user relative to the computing device is monitored;

sending the continuous presence assertion to the key distribution center server;

determining whether the user remains present relative to the computing device; and notifying the service provider server of a loss of the continuous presence of the user relative to the computing device in response to a determination that the user did not remain present relative to the computing device.

* * * * *